(12) United States Patent
Abe et al.

(10) Patent No.: US 7,459,253 B2
(45) Date of Patent: Dec. 2, 2008

(54) TONER AND METHOD OF PRODUCING TONER

(75) Inventors: Koji Abe, Numazu (JP); Shinya Yachi, Mishima (JP); Emi Tosaka, Shizuoka-ken (JP); Satoshi Handa, Shizuoka-ken (JP); Kazumi Yoshizaki, Shizuoka-ken (JP); Yasuhiro Hashimoto, Mishima (JP); Yushi Mikuriya, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/739,983

(22) Filed: Apr. 25, 2007

(65) Prior Publication Data

US 2007/0212631 A1    Sep. 13, 2007

Related U.S. Application Data

(63) Continuation of application No. PCT/JP2006/313364, filed on Jun. 28, 2006.

(30) Foreign Application Priority Data

Mar. 13, 2006    (JP) ............................... 2006-067100

(51) Int. Cl.
*G03G 9/08*    (2006.01)
(52) U.S. Cl. .............. 430/109.3; 430/111.4; 430/110.3; 430/137.14
(58) Field of Classification Search .............. 430/109.3, 430/111.4, 110.3, 137.14
See application file for complete search history.

(56) References Cited

U.S. PATENT DOCUMENTS 7,241,546 B2    7/2007    Moriki et al. ............ 430/110.3
2004/0229143 A1*    11/2004    Umemura et al. ......... 430/108.4
2005/0026055 A1*    2/2005    Moriki et al. .................. 430/45
2007/0212631 A1    9/2007    Abe et al. ................ 430/109.3

FOREIGN PATENT DOCUMENTS

| JP | 63-58356 | 3/1988 |
|---|---|---|
| JP | 8-334926 | 12/1996 |
| JP | 2000-147828 | 5/2000 |
| JP | 2002-202629 | 7/2002 |
| JP | 2003-005441 | 1/2003 |
| JP | 2003-098858 | 4/2003 |
| JP | 2003-208047 | 7/2003 |
| JP | 2003-246920 | 9/2003 |
| JP | 2003-280421 | 10/2003 |
| JP | 2005-300816 | 10/2005 |
| JP | 2006-039366 | 2/2006 |

* cited by examiner

*Primary Examiner*—John L Goodrow
(74) *Attorney, Agent, or Firm*—Fitzpatrick, Cella, Harper & Scinto

(57) ABSTRACT

A toner is provided which is excellent in low-temperature fixability and offset resistance, has a wide fixing temperature range, provides fixed images with high gloss, and can form toner images having high quality. The toner is composed of toner particles having toner base particles each containing a binder resin and a colorant. When the viscosities of each of the toner particles measured at 100° C. and 110° C. by a flow tester heat-up method are represented by $\eta_{100}$ (Pa·s) and $\eta_{110}$ (Pa·s), respectively, an average variation in viscosity $A_{\eta T}$ represented by the following equation (1) satisfies the relationship of $0 \geq A_{\eta T} \geq -0.064$:

$$A_{\eta T} = (\log(\eta_{110}) - \log(\eta_{100}))/(110-100); \text{ and} \quad (1)$$

$\eta_{100}$ is 15,000 to 40,000 Pa·s.

9 Claims, 1 Drawing Sheet

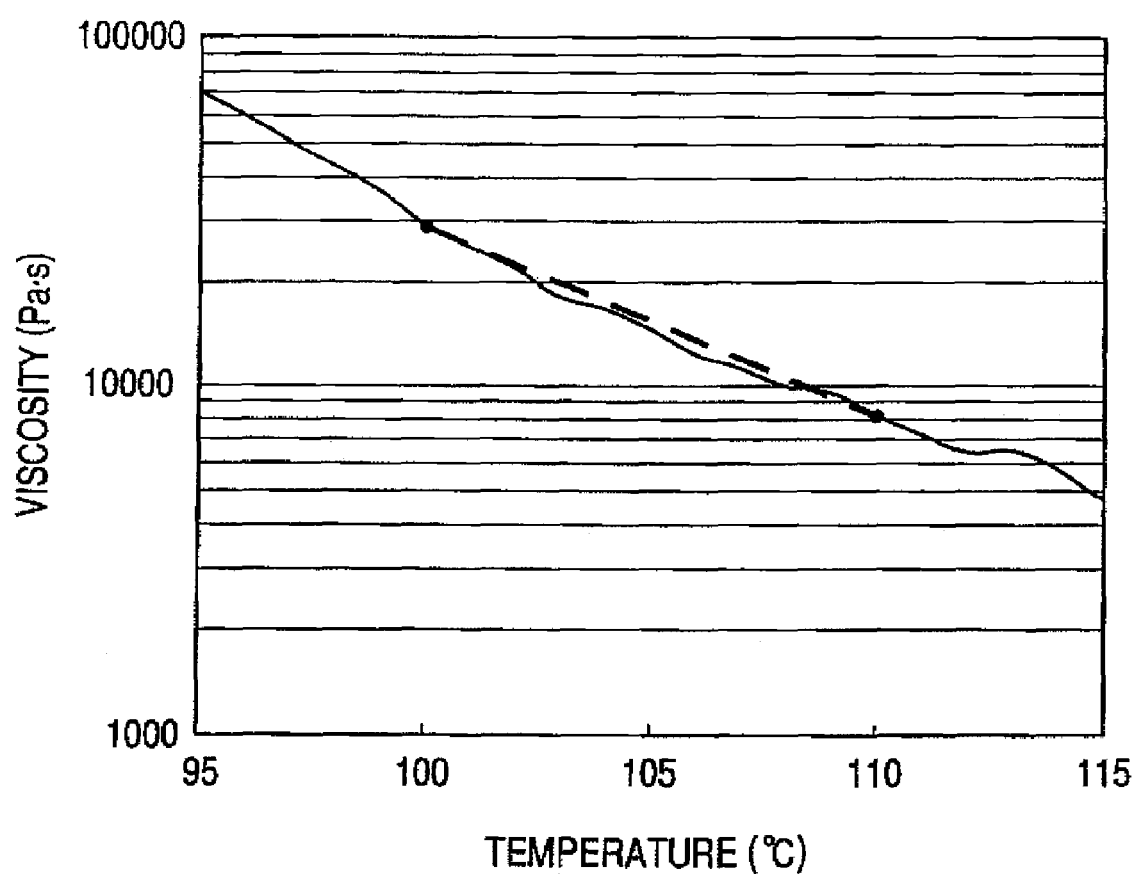
FIGURE

TONER AND METHOD OF PRODUCING TONER

This application is a continuation of International Application No. PCT/JP2006/313364 filed on Jun. 28, 2006, which claims the benefit of Japanese Patent Application No. 2006-067100 filed on Mar. 13, 2006.

BACKGROUND OF THE INVENTION

1. Field of the Invention

The present invention relates to a toner for developing an electrostatic charge image by an image forming method such as electrophotography or electrostatic printing, or a toner for a toner-jet system. In addition, the present invention relates to a method of producing the toner.

2. Description of the Related Art

An image forming method involving visualizing an electrical or magnetic latent image on a recording medium by using toner is employed for developing the latent image. A representative example of the image forming method is an electrophotographic method. The electrophotographic method involves: electrically forming a latent image on a photosensitive member by using various means; developing the latent image with toner to form a toner image; transferring the toner image onto a transfer material such as paper as required; and fixing the toner image to the transfer material by employing a fixing means such as heating, pressurization, pressurization under heat, or solvent steam to provide an image.

A heat roller fixing method or a film fixing method involves causing a heat roller or a fixation film to pass a toner image on a sheet to be fixed while contacting the heat roller or the fixation film with the toner image to perform fixation. In each of the fixing methods, the surface of the heat roller or of the fixation film and toner on the sheet to be fixed are brought into contact with each other, hence thermal efficiency in melt-attaching the toner to the sheet to be fixed is extremely good. Accordingly, the fixing methods enable fixation to be performed quickly, and are extremely useful in an electrophotographic device. However, in each of the above fixing methods, the surface of the heat roller or of the fixation film contacts with the toner in a molten state, so that part of the toner adheres to the surface of the heat roller or of the fixation film. As a result, an offset phenomenon in which the toner adhering to the surface of the heat roller or of the fixation film transfers to the next sheet to be fixed again occurs, and the sheet to be fixed is contaminated in some cases.

An additional improvement in toner performance such as fixability or offset resistance is needed for coping with recent demands on an electrophotographic device, such as reductions in size and weight, energy saving, and an improvement in reliability.

A toner has been disclosed in which a rate of change in flow tester viscosity of the toner is specified (see Japanese Patent Application Laid-Open No. S63-58356). In addition, a toner has been disclosed in which the absolute value of the gradient of the graph of a resin mixture is specified (see Japanese Patent Application Laid-Open No. H08-334926). However, a toner has been desired which has better low-temperature fixability, higher gloss and a wider fixable temperature region, and is more excellent in durability, as compared with the toners disclosed in Japanese Patent Application Laid-Open No. S63-58356 and Japanese Patent Application Laid-Open No. H08-334926 mentioned above.

SUMMARY OF THE INVENTION

An object of the present invention is to provide a toner that has solved the above problems.

More specifically, an object of the present invention is to provide a toner which: is excellent in low-temperature fixability and offset resistance; has a wide fixing temperature range; provides fixed images with high gloss at the time of fixation; and can form toner images excellent in durability and having high quality.

The present invention relates to a toner including toner particles having toner base particles containing at least a binder resin and a colorant, wherein the toner base particles are particles to be produced in an aqueous or hydrophilic medium, and when viscosities of the toner particles measured at 100° C. and 110° C. by a flow tester heat-up method are represented by $\eta_{100}$ (Pa·s) and $\eta_{110}$ (Pa·s), respectively, an average variation in viscosity $A_{\eta T}$ represented by the following equation (1) satisfies a relationship of $0 \geq A_{\eta T} \geq -0.064$:

$$A_{\eta T} = (\log(\eta_{110}) - \log(\eta_{100}))/(110-100) \quad (1); \text{ and}$$

$\eta_{100}$ is 15,000 to 40,000 Pa·s.

Further features of the present invention will become apparent from the following description of exemplary embodiments with reference to the attached drawing.

BRIEF DESCRIPTION OF THE DRAWING

FIGURE is a graph showing an example of a reversing heat flow curve obtained by DSC measurement of toner.

DESCRIPTION OF THE EMBODIMENTS

Hereinafter, the present invention will be described in detail.

A value of the viscosity of toner by a flow tester heat-up method in the present invention is determined by the following method.

For example, a flow tester CFT-500D (manufactured by Shimadzu Corporation) is used as a device, and the measurement is performed under the following conditions.

Sample: About 1.0 g of toner is weighed, and is molded by using a pressure mold under a load of 100 kg/cm² for 1 minute to prepare a sample.

Die hole diameter: 1.0 mm
Die length: 1.0 mm
Cylinder pressure: $9.807 \times 10^5$ (Pa)
Measurement mode: Heat-up method
Rate of temperature increase: 4.0° C./min The viscosity (Pa·s) of the toner at the temperature of 50° C. to 200° C. is measured by the above method, and the viscosity (Pa·s) of the toner at each of 100° C. and 110° C. is determined.

The toner of the present invention has a viscosity at 100° C. by a flow tester heat-up method in the range of preferably 15,000 Pa·s or more and 40,000 Pa·s or less, or more preferably 20,000 Pa·s or more and 35,000 Pa·s or less. The viscosity at 100° C. is so adjusted as to fall within that range, thus a toner excellent in low-temperature fixability and image gloss can be obtained. A viscosity of less than 15,000 Pa·s is not preferable because a reduction in gloss occurs owing to, for example, the penetration of the toner into a medium (transfer material). To be specific, a viscosity of less than 15,000 Pa·s is not preferable because, in association with the long-term use of the toner, an inorganic fine powder added as an external additive is embedded in the surface of a toner particle, or a toner particle deforms to make triboelectric charging properties non-uniform, and a phenomenon in which the toner adheres to a non-image portion on a transfer material (hereinafter referred to as "fog") is apt to occur. A viscosity in excess of 40,000 Pa·s is not preferable because a toner particle cannot sufficiently deform at the time of a fixing step in high-speed, low-temperature printing, and the peeling of a toner image upon rubbing of the surface of a fixed image is apt to occur.

In the toner of the present invention, $A_{\eta T}=(\log(\eta_{110})-\log(\eta_{100}))/(110-100)$ showing an average variation in viscosity per 1° C. from 100° C. to 110° C. is preferably −0.064 to 0, and more preferably −0.060 to 0. When satisfying such a requirement, the toner of the present invention comes to be excellent in low-temperature fixability and image gloss and to exhibit excellent high-temperature offset resistance and excellent durability while maintaining the performance of the toner. $A_{\eta T}$ of less than −0.064 is not preferable because a rate of change in viscosity with temperature (absolute value) is so large that the gloss of a fixed image becomes uneven owing to a change in fixing temperature.

A viscosity at 100° C. to 110° C. correlates with the fixability of the toner, in particular, gloss. If reducing a change in viscosity (absolute value) due to a temperature change, gloss unevenness due to a change in temperature of a fixing unit and due to a difference in environment such as a difference in temperature or in humidity can be reduced.

The molecular weight distribution of the THF soluble matter of the toner of the present invention can be measured by using a GPC measuring device (HLC-8120GPC, manufactured by TOSOH CORPORATION) under the following measurement conditions.

<Measurement Conditions>

Column (manufactured by SHOWA DENKO K.K.): A series of seven columns, that is, Shodex GPC KF-801, Shodex GPC KF-802, Shodex GPC KF-803, Shodex GPC KF-804, Shodex GPC KF-805, Shodex GPC KF-806 and Shodex GPC KF-807 (each having a diameter of 8.0 mm and a length of 30 cm)

Temperature: 40° C.
Flow rate: 0.6 ml/min
Detector: RI
Sample concentration: 10 µl of a 0.1-mass % sample The sample is prepared as described below. A toner sample to be measured is placed in tetrahydrofuran (THF), and left standing for 6 hours. After that, the resultant solution is sufficiently shaken until aggregates of the sample disappears, and then left standing for an additional one or more days. The resultant solution is filtered by using a sample treatment filter (pore size: 0.45 µm) to prepare a sample for GPC measurement. A molecular weight calibration curve created by using a monodisperse polystyrene standard sample is used as an analytical curve.

An endothermic main peak in a reversing heat flow curve measured by differential scanning calorimetry (DSC) is preferably present in the range of 40 to 130° C., and the heat quantity integrated value Q of the revering heat flow curve is preferably 10 to 35 J/g per 1 g of toner. The reason for this is probably as follows: setting DSC properties as described above enables good releasability to be shown even at the time of low-temperature fixation, and besides, wax appropriately alleviates the intermolecular force between polymer chains of a binder resin so that a state in which the softening of the toner due to absorption of heat at the time of fixation and the curing of the resin due to the heat radiation of the toner are appropriate can be established. The heat quantity integrated value Q represented by the peak area of the reversing heat flow curve can be adjusted by appropriately selecting, for example, a type of wax and the content thereof. It should be noted that the endothermic main peak in the reversing heat flow curve is present in the range of more preferably 50 to 110° C., and still more preferably 60 to 90° C.

When the heat quantity integrated value Q represented by the region surrounded by the straight line connecting measurement points at 40° C. and 130° C. and the reversing heat flow curve is less than 10 J/g per 1 g of toner, the fixability is lowered, the gloss of a fixed image is reduced, and an effect of inhibiting a fixing member, etc. from being shaved or flawed is reduced. On the other hand, when the heat quantity integrated value Q exceeds 35 J/g per 1 g of toner, the plasticizing effect of the wax becomes so large that the offset resistance is reduced.

A method of producing toner base particles in the present invention is preferably a method of directly producing toner in a hydrophilic medium (hereinafter referred to also as the "polymerization method") such as a suspension polymerization method, an interfacial polymerization method or a dispersion polymerization method. Toner base particles produced by the polymerization method (hereinafter referred to also as the "polymerization toner") have high transferability because the particles are uniformized to be of a substantially spherical shape and the charge amount distribution of the particles is relatively uniform. Of the above polymerization methods, the suspension polymerization method is particularly preferable for producing the toner base particles of the present invention.

The suspension polymerization method is a polymerization method of producing toner base particles involving at least: a granulating step of dispersing a polymerizable monomer composition having at least a polymerizable monomer, a colorant, wax, and the like into an aqueous medium to produce droplets of the polymerizable monomer composition; and a polymerizing step of polymerizing the polymerizable monomer in the droplets.

In addition, when the toner of the present invention is produced, a low-molecular weight resin is preferably incorporated into the polymerizable monomer composition. The weight average molecular weight (Mw) of the THF soluble matter of the low-molecular weight resin determined by GPC is preferably 2,000 to 6,000 in terms of low-temperature fixability and blocking resistance.

The low-molecular weight resin is preferably an addition reactive resin having a reactive functional group because a change in viscosity of the toner at high temperature is alleviated so that high-temperature offset resistance and durability are improved. Preferable examples of the functional group include a double bond and an isocyanate group.

An addition reactive resin produced by polymerization at a high temperature equal to or higher than 150° C. is desirably used in the production of the toner base particles of the present invention. In the case of a styrene resin produced by polymerization at a high temperature equal to or higher than 150° C., peaks originating from double bonds are observed in the range of 4.6 to 4.9 ppm and in the range of 5.0 to 5.2 ppm in the measurement by $^1$H-NMR using a heavy chloroform solvent. That is, an addition reactive resin obtained as described above has double bonds, and these double bonds are involved in a reaction at the time of the production of the toner base particles, whereby a crosslinking reaction occurs. Thus, a small amount of a crosslinking structure is introduced into the toner base particles, whereby the rate of change in viscosity of the toner at high temperature can be reduced with improved effectiveness. When the weight average molecular weight is 2,000 to 6,000, reactivity is moderate as compared to low-molecular weight crosslinking agents (such as divinylbenzene) that have been conventionally used, thus the degree of crosslinking is reduced. As a result, toner base particles can be obtained having a low viscosity and a heat characteristic with which a temperature-dependent rate of change in viscosity is small.

Of addition reactive resins of the above type, an addition reactive resin having a glass transition point of 40 to 100° C. is preferable. When the glass transition point is lower than 40° C., the strength of the entire toner base particles is reduced, thus a reduction in transferability or in development properties is apt to occur at the time of a many-sheet feed endurance test. Furthermore, toner particles are apt to aggregate together under a high-temperature, high-humidity environment, and storage stability tends to be reduced. On the other hand, when the glass transition point exceeds 100° C., a problem referred to as fixation failure is apt to occur.

The glass transition point of the addition reactive resin is more preferably 40 to 70° C., or still more preferably 40 to 65° C. in terms of low-temperature fixability and the obtainment of high-gloss images.

The addition reactive resin is preferably used in such a manner that the amount of the resin to be added is 0.1 to 75 mass % in the binder resin in the toner base particles. When the amount in the binder resin in the toner base particles is less than 0.1 mass %, an effect of the addition of the addition reactive resin is small. On the other hand, when the amount exceeds 75 mass %, a reduction in viscosity of the binder resin due to melting at the time of fixation becomes large, so that the binder resin is apt to penetrate into paper, and hence high-temperature offset resistance is reduced.

When toner is produced by the suspension polymerization method, a polar resin can be added into a polymerizable monomer composition to perform polymerization with a view to improving the shape of a toner base particle, the dispersibility or fixability of a material or image properties. For example, when wishing to introduce into toner a monomer component containing a hydrophilic functional group such as an amino group, a carboxylic acid group, a hydroxyl group, a sulfonic acid group, a glycidyl group or a nitrile group, which is unable to be used in an aqueous suspension because the component dissolves in the suspension to cause emulsion polymerization, the monomer component can be used in the form of: a copolymer of the monomer component and a vinyl compound such as styrene or ethylene such as a random copolymer, a block copolymer or a graft copolymer; a polycondensate such as polyester or polyamide; or an addition polymer such as polyether or polyimine.

Examples of a resin having a low molecular weight that can be added into a polymerizable monomer composition in addition to the foregoing include: homopolymers of styrene and a substituted product thereof such as polystyrene and polyvinyl toluene; styrene-type copolymers such as a styrene-propylene copolymer, a styrene-vinyl toluene copolymer, a styrene-vinyl naphthalene copolymer, a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-maleic acid copolymer, and a styrene-maleate copolymer; polymethyl methacrylate; polybutyl methacrylate; polyvinyl acetate; polyethylene; polypropylene; polyvinyl butyral; silicone resin; polyester resin; polyamide resin; epoxy resin; polyacrylic resin; rosin; modified rosin; terpene resin; phenol resin; aliphatic or alicyclic hydrocarbon resin; and aromatic petroleum resin. One of them can be used alone, or two or more of them can be used in combination.

Of those low-molecular weight resins, a low-molecular weight resin having a glass transition point of 40 to 100° C. is preferable. When the glass transition point is lower than 40° C., the strength of the entire toner base particles is reduced, and a reduction in transferability or in development properties is apt to occur at the time of a many-sheet feed endurance test. Furthermore, the toner base particles are apt to aggregate together under a high-temperature, high-humidity environment, hence a problem is raised in that storage stability is lowered. On the other hand, when the glass transition point exceeds 100° C., a problem referred to as fixation failure is apt to occur.

The glass transition point of the low-molecular weight resin is more preferably 40 to 70° C., or still more preferably 40 to 65° C. in terms of low-temperature fixability and the obtainment of high-gloss images.

The amount of the low-molecular weight resin to be added is 0.1 to 75 mass % in the binder resin of the toner base particles. When the amount in the binder resin of the toner base particles is less than 0.1 mass %, an effect of the addition of the low-molecular weight resin is small. On the other hand, when the amount exceeds 75 mass %, a reduction in viscosity of the binder resin due to melting at the time of fixation becomes large, so that the binder resin is apt to penetrate into paper, and hence high-temperature offset resistance is reduced. In addition, the duration stability of the toner may reduce.

The toner of the present invention is preferably a toner having toner base particles each having at least a core portion and a shell portion. The shell portion is so present as to cover the core portion in each of the toner base particles. With such a structure, charging failure or blocking due to the exudation of the core portion to the surface of a toner particle can be prevented. In addition, it is more preferable that the surface layer portion different from the shell portion in resin composition is additionally present on the surface of the shell portion. The presence of the surface layer portion can additionally improve environmental stability, durability, and blocking resistance.

In the present invention, a specific method of measuring the shape of the cross section of toner is as follows, for example. Toner is sufficiently dispersed into an epoxy resin curable at room temperature, then left standing at a temperature of 40° C. for 2 days to be cured. The resultant cured product is cut into a flaky sample by using a microtome equipped with a diamond cutting tooth. The flaky sample is subjected to staining resulting from a slight difference in crystallinity by using triruthenium tetroxide and triosmium tetroxide in combination and further irradiated with an electron beam, photographing a difference in contrast due to an electron density by using a transmission electron microscope (TEM).

In the present invention, whether each of the toner base particles has a core/shell structure can be judged in accordance with the above measurement method on the basis of the result of the observation of the cross section photograph taken with a transmission electron microscope. In the cross section photograph, toner base particles each having a short diameter of $D4\pm(D4\times0.2)$ μm (where D4 represents the weight average particle size of the entire toner base particles) are selected, and the selected toner base particles are defined as objects to be observed. When the core portion is covered with the shell portion, it is judged that the core portion is included. The cumulative sum of 100 or more particles are observed, and the ratio at which the core portions are included is determined to be an inclusion ratio (number %).

In the present invention, when the inclusion ratio of the core portions was in the range of 60 to 100 number %, the core/shell structure was defined as being formed. When the inclusion ratio of core portions is less than 60 number %, environmental stability or duration stability may be reduced owing to an influence of the exposure of a core portion to the toner surface.

In the present invention, whether the surface layer portion (hereinafter referred to also as the "surface layer structure") is present on the surface of the shell portion can be judged in accordance with the above measurement method on the basis of a result provided by a transmission electron microscope. The cumulative sum of 100 particles are observed in the cross section photograph of toner base particles each having a short diameter of D4±(D4×0.2) μm where D4 represents the weight average particle size of the entire toner base particles. The ratio of toner having the surface layer structure is defined as a toner surface layer structure ratio (number %). In the present invention, when the toner surface layer structure ratio was in the range of 60 to 100 number %, it was judged that the surface layer structure was formed. When the toner surface layer structure ratio is less than 60 number %, the environmental stability or duration stability of the toner may be reduced.

In the present invention, the surface layer portion preferably accounts for 0.5 to 80% of the surface area of a toner base particle.

A material of which the surface layer portion present on the surface of the shell portion is constituted preferably has a molecular chain polar structure.

The term "molecular chain polar structure" as used herein refers to a molecular structure in which atoms in a molecule have a large number of $\delta^+$ or $\delta^-$ electron density states.

A resin molecule is constituted of multiple types of atoms. The atoms of which the molecule is constituted each have an inherent electronegativity, and values of electronegativities largely vary according to atoms. Electrons are localized in the molecule owing to the difference in electronegativity. The state of the localization in this case changes depending on the types and number of atoms of which the molecule is constituted and on the manner in which the atoms are bound to each other, whereby the polarity of the molecular chain is changed.

A bond structure formed by condensation polymerization or addition polymerization is a preferable example of the molecular chain polar structure. Specific examples of the bond structure include an ester bond (—COO—), an ether bond (—O—), an amide bond (—CONH—), an imine bond (—NH—), a urethane bond (—NHCOO—) and a urea bond (—NHCONH—).

For example, an ether chain (—CH$_2$—O—CH$_2$—) is in a state that electrons on a carbon atom are slightly deficient ($\delta^+$), electrons on an oxygen atom are slightly excessive ($\delta^-$), and furthermore, a bond angle the apex of which the oxygen atom is present at is formed. When a large number of molecular chains polarized in this way are present, the polarity of the molecule, that is, a resin increases. When the number of polarized molecular chains is small, the polarity of the resin reduces. In addition, in general, the polarity of a molecule composed of hydrocarbon is low.

Charging stability improves when the surface layer portion has a molecular chain polar structure. In addition, when the toner base particles are produced in a polar solvent such as an aqueous or hydrophilic medium, the charging stability of the toner at high temperature and high humidity or at low temperature and low humidity, and the durability of the toner at the time of high-speed printing improve because the surface layer portion having a molecular chain polar structure is formed near the toner surface with improved uniformity.

In the present invention, suitable examples of a resin from which the surface layer portion is formed include a polyester resin and a polyester resin modified by a styrene-type polymer, and a styrene-modified polyester resin is particularly preferable.

A vinyl-type polymerizable monomer may be preferably cited as a polymerizable monomer that may be used to produce toner base particles in the present invention. Examples of the polymerizable monomer include: styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate and 2-benzoyloxy ethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate and dibutyl phosphate ethyl methacrylate; methylene aliphatic monocarboxylic acid esters; vinyl esters such as vinyl acetate, vinyl propionate, vinyl benzoate, vinyl butyrate, vinyl benzoate and vinyl formate; vinyl ethers such as vinyl methyl ether, vinyl ethyl ether and vinyl isobutyl ether; and vinyl ketone such as vinyl methyl ketone, vinyl hexyl ketone, and vinyl isopropyl ketone.

The shell portion is constituted of vinyl-type polymers formed from those vinyl-type polymerizable monomers or vinyl-type polymers having been added. Of those vinyl-type polymers, a styrene polymer, a styrene-acrylic copolymer or a styrene-methacrylic copolymer is preferable in the respect that a wax from which the inside or central portion of the toner is mainly formed is efficiently covered.

Wax is a preferable material of which the core portion of the toner of the present invention is constituted.

Examples of a wax component that may be used in the toner according to the present invention include: petroleum-type waxes such as a paraffin wax, a microcrystalline wax, and petrolatum, and derivatives thereof; a montan wax and derivatives thereof; a hydrocarbon wax according to a Fischer-Tropsch method and derivatives thereof; polyolefin waxes such as polyethylene and polypropylene and derivatives thereof; and natural waxes such as a carnauba wax and a candelilla wax and derivatives thereof. The term "derivative(s)" includes oxides, block copolymers with vinyl-type monomers and graft-modified products. Furthermore, any one of: higher aliphatic alcohols; aliphatic acids such as stearic acid and palmitic acid and compounds thereof; acid amide waxes; ester waxes; ketones; hardened castor oil and derivatives thereof; vegetable waxes; animal waxes; and a silicone resin, can also be used.

Of the ester waxes, a wax having one or more long-chain ester parts each having 10 or more carbon atoms and each represented by any one of the following formulae (1) to (6) is particularly preferable because the transparency of an OHP can be maintained:

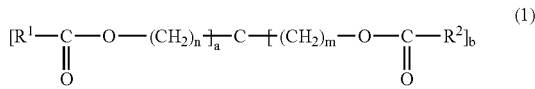

where a and b each represent an integer of 0 to 4, a+b=4, $R^1$ and $R^2$ each represent a hydrocarbon group having 1 to 40 carbon atoms, n and m each represent an integer of 0 to 15, and n and m are not simultaneously 0;

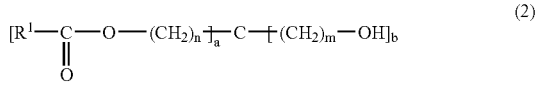

where a and b each represent an integer of 1 to 3, a+b=4, $R^1$ represents a hydrocarbon group having 1 to 40 carbon atoms, n and m each represent an integer of 0 to 15, and n and m are not simultaneously 0;

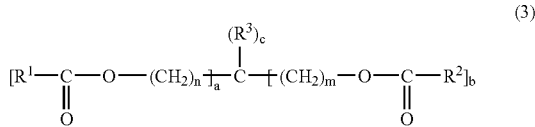

where a and b each represent an integer of 0 to 3, a+b=2 or 3, $R^1$ and $R^2$ each represent a hydrocarbon group having 1 to 40 carbon atoms, $R^3$ represents an organic group having one or more carbon atoms, c represents 2 or 1, a+b+c=4, n and m each represent an integer of 0 to 15, and n and m are not simultaneously 0;

$$R^1\text{—COO—}R^2 \quad (4)$$

where $R^1$ and $R^2$ each represent a hydrocarbon group having 1 to 40 carbon atoms, and $R^1$ and $R^2$ may have the number of carbon atoms identical to or different from each other;

where $R^1$ and $R^2$ each represent a hydrocarbon group having 1 to 40 carbon atoms, n represents an integer of 2 to 20, and $R^1$ and $R^2$ may have the number of carbon atoms identical to or different from each other;

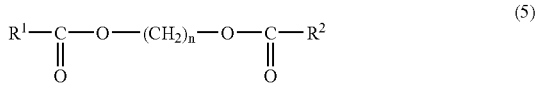

where $R^1$ and $R^2$ each represent a hydrocarbon group having 1 to 40 carbon atoms, n represents an integer of 2 to 20, and $R^1$ and $R^2$ may have the number of carbon atoms identical to or different from each other.

The weight average molecular weight (Mw) of the wax is preferably 300 to 1,500. When the weight average molecular weight is less than 300, the exudation of the wax to the surface of a toner particle is apt to occur. When the weight average molecular weight exceeds 1,500, low-temperature fixability is lowered. A wax having a weight average molecular weight (Mw) in the range of 400 to 1,250 is particularly preferable. Furthermore, a ratio (Mw/Mn) of the weight average molecular weight to a number average molecular weight is preferably 1.5 or less. In this case, the peak of the DSC endothermic curve of the wax becomes additionally sharp, the mechanical strength of toner particles at room temperature improves, and a sharp melt property is shown at the time of fixation.

Specific examples of the above ester waxes include the following compounds.

1) $CH_3(CH_2)_{20}COO(CH_2)_{21}CH_3$
2) $CH_3(CH_2)_{17}COO(CH_2)_9OOC(CH_2)_{17}CH_3$
3) $CH_3(CH_2)_{17}OOC(CH_2)_{18}OOC(CH_2)_{17}CH_3$

There has been a growing need for full-color images on both sides in recent years. When forming images on both sides, there is a possibility that a toner image formed on the front surface of a transfer material passes through the heating portion of a fixing unit even at the time of subsequently forming an image on the rear surface of the material, hence the high-temperature offset resistance of the fixed toner image at that time must be sufficiently taken into consideration. As a specific measure therefor, it is preferable to add 2 to 30 mass % of wax into toner base particles. When the wax is added in an amount of less than 2 mass %, high-temperature offset resistance is reduced, and besides, the image on the rear surface may show an offset phenomenon at the time of the fixation of images on both sides. When the wax is added in an amount in excess of 30 mass %, aggregates of toner base particles are apt to occur at the time of granulation in the production by a polymerization method, and a wide particle size distribution is apt to be created.

In the toner particles of the present invention, particles each having a particle size of 2 μm or more preferably have an average circularity of 0.970 to 1.000 and a mode circularity of 0.98 to 1.00.

The "circularity" in the present invention is a simple measure for quantitatively representing the shape of a particle. In the present invention, measurement is performed by using a flow-type particle image analyzer FPIA-2100 manufactured by SYSMEX CORPORATION, and a value determined from the following equation is defined as a circularity.

Circularity $a = L_0/L$ $L_0$: Circumferential length of a circle having the same projected area as a particle image L: Circumferential length of the particle image The circularity in the present invention is a measure showing the degree of irregularities of toner particles. When a toner particle is of a completely spherical shape, the circularity is 1.00. The more complicated the surface shape, the lower the circularity is.

Toner particles having an average circularity of 0.970 to 1.000 are preferable because they are extremely excellent in transferability. This is probably because the contact area between toner and a photosensitive member is so small that adhesive force of the toner to the photosensitive member resulting from mirror force or Van der Waals force is reduced. Therefore, the use of such toner provides a high transfer rate and extremely reduces the amount of transfer residual toner, hence it is thought that the amount of toner is extremely reduced at the portion where a charging member and a photosensitive member are brought into pressure contact with each other, toner melt-adhesion is prevented, and image defects are significantly suppressed.

Those effects are remarkably exhibited in an image forming method including a contact transfer step in which transfer hollows is apt to occur.

In addition, the mode circularity is defined as described below. Circularities in the range of 0.40 to 1.00 are divided into 61 ranges in an increment of 0.01 including the range from 0.40 (inclusive) to 0.41 (exclusive), the range from 0.41 (inclusive) to 0.42 (exclusive), - - - , the range from 0.99 (inclusive) to 1.00 (exclusive), and 1.00. The circularities of the respective measured particles are assigned to the respective divisional ranges. The lower limit circularity of the divisional range where a frequency value becomes the maximum in circularity frequency distribution is defined as the mode circularity.

In addition, that a mode circularity is 0.98 to 1.00 in the circularity distribution of toner particles means that most of the toner particles each have a shape close to a true spherical shape. A mode circularity of 0.98 to 1.00 is preferable because the adhesive force of toner to a photosensitive member resulting from mirror force or Van der Waals force is remarkably reduced and transfer efficiency becomes extremely high.

In the present invention, any one of charge control agents is preferably added to toner particles for the purpose of controlling the chargeability of the toner particles.

Of those known charge control agents, one having substantially no polymerization inhibiting property and substantially no aqueous phase migration characteristic is preferable. Examples of a positive charge control agent include: nigrosin-type dyes; triphenylmethane-type dyes; quaternary ammonium salts; guanidine derivatives; imidazole derivatives; and amine-type compounds. Examples of a negative charge control agent include: metal-containing salicylic acid copolymers; metal-containing monoazo-type dye compounds; urea derivatives; styrene-acrylic acid copolymers; and styrene-methacrylic acid copolymers.

Each of those charge control agents is preferably added in an amount of 0.1 to 10 mass % with respect to the binder resin or the polymerizable monomer.

Examples of a polymerization initiator to be used in the production of toner base particles employing a polymerization method include: azo-type or diazo-type polymerization initiators such as 2,2'-azobis-(2,4-divaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile; and peroxide-type polymerization initiators such as benzoyl peroxide, methyl ethyl ketone peroxide, diisopropyl oxycarbonate, cumene hydroperoxide, 2,4-dichlorobenzoyl peroxide, and lauroyl peroxide. Those polymerization initiators are preferably added in an amount of 0.5 to 20 mass % with respect to a polymerizable monomer, and one of them may be used alone or two or more of them may be used in combination.

A chain transfer agent may be added for controlling the molecular weight of the binder resin of the toner base particles. The chain transfer agent is preferably added in an amount of 0.001 to 15 mass % with respect to the polymerizable monomer.

A crosslinking agent may be added for controlling the molecular weight of the binder resin of the toner base particles. Examples of the crosslinking monomers to be used in the present invention include, as a bifunctonal crosslinking agent, divinylbenzene, bis(4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, polyester-type diacrylates (MANDA, Nippon Kayaku Co., Ltd.), and those obtained by changing the above acylates to methacrylates.

Examples of the polyfunctional crosslinking monomers include pentaerythritol triacrylate, trimethylolethane triacrylate, trimethylolpropane triacrylate, tetramethylolmethane tetraacrylate, oligoester acrylate and methacrylate thereof, 2,2-bis(4-mathacryloxypolyethoxyphenyl)propane, diacrylphthalate, triallylcyanurate, triallylisocyanurate, triallyltrimelitate, and diallylchlorendate. Those crosslinking agents are preferably added in an amount of 0.001 to 15 mass % of the polymerizable monomer.

In the present invention, in addition to the foregoing, various additives shown below may be added to the toner base particles for the purpose of imparting various properties. Each of the additives preferably has a particle size of one tenth or less of the weight average particle size of the toner base particles in terms of durability upon addition to the toner base particles. The particle size of each of the additives refers to an average particle size of each of the additives determined from the observation of the surface of each of the toner base particles with an electron microscope. Examples of the additives used for imparting various properties include the following:

1) Fluidity imparting agents: Metal oxides (such as silica, alumina, and titanium oxide), carbon black, and fluorocarbon. It is preferable that each of them has been subjected to hydrophobic treatment.

2) Abrasives: Metal oxides (such as strontium titanate, cerium oxide, alumina, magnesium oxide and chromium oxide), nitrides (such as silicon nitride), carbides (such as silicon carbide), and metal salts (such as calcium sulfate, barium sulfate, and calcium carbonate).

3) Lubricants: Fluorocarbon resin powders (made of, for example, vinylidene fluoride or polytetrafluoroethylene) and aliphatic acid metal salts (such as zinc stearate and calcium stearate).

4) Charge controlling particles: Metal oxides (such as tin oxide, titanium oxide, zinc oxide, silica, and alumina) and carbon black.

Those additives are used in an amount of 0.1 to 10 parts by mass, or preferably 0.1 to 5 parts by mass with respect to 100 parts by mass of the toner base particles. One of those additives may be used alone, or two or more of them may be used in combination.

In addition, the toner particles have a weight average particle size (D4) of preferably 2.0 to 12.0 µm, more preferably 4.0 to 9.0 µm, or still more preferably 5.0 to 8.0 µm.

The toner particles have a glass transition point (Tg) of preferably 40 to 100° C., more preferably 40 to 80° C., or particularly preferably 45 to 70° C. When the glass transition point is lower than 40° C., the blocking resistance of the toner is reduced. When the glass transition point exceeds 100° C., the low-temperature offset resistance of the toner and the transparency of a transmission image of a film for an overhead projector is lowered.

The content of THF insoluble matter in the toner particles is preferably 0.1 to 20.0 mass %. When the content of the THF insoluble matter is less than 0.1 mass %, high-temperature offset resistance tends to be reduced. When that content exceeds 20.0 mass %, low-temperature fixability tends to be reduced.

The THF insoluble matter of the toner particles shows the mass ratio of an ultrahigh molecular weight polymer component (substantially crosslinked polymer) insoluble in a THF solvent. A value measured as described below is defined as the THF insoluble matter of the toner.

1.0 g of the toner is weighed ($W_1$ g). The weighed toner is placed in an extraction thimble (such as No. 86R manufactured by ADVANTEC), subjected to a Soxhlet extractor, and extracted by using 200 ml of THF as a solvent for 20 hours. After a volatile matter in the obtained extract is evaporated, the resultant product is dried in vacuum at 40° C. for several hours. Then, the amount of a THF-soluble resin component is weighed ($W_2$ g). The weight of components such as a pigment other than the resin component in the toner particles is represented by $W_3$ (g). The content of the THF insoluble matter can be determined from the following equation.

$$THF \text{ insoluble matter } (\%) = \left[ \frac{W_1 - (W_3 + W_2)}{(W_1 - W_3)} \right] \times 100$$

The THF insoluble matter of the toner can be adjusted depending on the degree of polymerization and degree of crosslinking of the binder resin.

A weight average molecular weight (Mw) in gel permeation chromatography (GPC) of the tetrahydrofuran (THF) soluble matter in the toner particles is preferably 15,000 to 80,000. Environmental stability and duration stability are favorably exerted in such toner particles. The weight average molecular weight in gel permeation chromatography (GPC) of the tetrahydrofuran (THF) soluble matter in the toner particles is more preferably 20,000 to 50,000. When the weight average molecular weight in gel permeation chromatography (GPC) of the tetrahydrofuran (THF) soluble matter in the toner particles is less than 15,000, blocking resistance and durability are apt to be reduced. On the other hand, when the weight average molecular weight exceeds 80,000, low-temperature fixability and high-gloss images are difficult to obtain.

In addition, a ratio (Mw/Mn) of the weight average molecular weight to a number average molecular weight in gel permeation chromatography (GPC) of the tetrahydrofuran (THF) soluble matter in the toner particles in the present invention is preferably 5 to 100. When the ratio (Mw/Mn) is less than 5, the fixable temperature region is narrow. When the ratio (Mw/Mn) exceeds 100, low-temperature fixability is apt to deteriorate.

In the present invention, the following compounds may be used as a dispersion stabilizer when toner base particles are produced by a polymerization method.

Examples of an organic compound that can be used include: polyvinyl alcohol; gelatin; methylcellulose; methylhydroxypropylcellulose; ethylcellulose; a sodium salt of carboxymethylcellulose; polyacrylic acid and a salt of the acid; polymethacrylic acid and a salt thereof; and starch.

Examples of the inorganic compounds that can be used include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina.

When an inorganic compound among the dispersion stabilizers is used, a commercially available inorganic compound may be used as it is. Alternatively, the inorganic compound may be produced in an aqueous dispersion medium in order to obtain fine particles. For example, calcium phosphate can be produced by mixing an aqueous solution of sodium phosphate and an aqueous solution of calcium chloride under high-speed stirring.

Each of those dispersion stabilizers is preferably used in an amount of 0.2 to 20.0 parts by mass with respect to 100 parts by mass of the polymerizable monomer.

A surfactant may be used in an amount of 0.001 to 0.100 part by mass with respect to 100 parts by mass of the polymerizable monomer for finely dispersing the dispersion stabilizer. This is for the purpose of promoting an initial action of the above dispersion stabilizer. Specific examples of the surfactant include sodium dodecylbenzenesulfonate, sodium tetradecyl sulfate, sodium pentadecyl sulfate, sodium octyl sulfate, sodium oleate, sodium laurate, sodium octylate, sodium stearate, and calcium oleate.

In the present invention, known colorants may be used.

Examples of a black pigment include carbon black, aniline black, non-magnetic ferrite, and magnetite.

Examples of a yellow pigment include condensed azo compounds such as yellow iron oxide, navel yellow, naphtol yellow S, hansa yellow G, hansa yellow 10G, benzidine yellow G, benzidine yellow GR, quinoline yellow lake, permanent yellow NCG, and tartrazine lake; isoindoline compound; anthraquinone compound; azo metal complex; methine compound; and allyl amide compound. To be specific, C.I. Pigment Yellow 12, 13, 14, 15, 17, 62, 74, 83, 93, 94, 95, 109, 110, 111, 128, 129, 147, 155, 168, 180, or the like can be preferably used.

Examples of an orange pigment include permanent orange GTR, pyrazolone orange, Balkan orange, benzidine orange G, indanthrene brilliant orange RK, and indanthrene brilliant orange GK.

Examples of a red pigment include condensed azo compounds such as colcothar, permanent red 4R, lithol red, pyrazolone red, watching red calcium salt, lake red C, lake red D, brilliant carmine 6B, brilliant carmine 3B, eoxyn lake, rhodamine lake B, and alizarine lake; diketopyrrolopyrrol compound; anthraquinone; quinacridone compound; base dyed lake compound; naphtol compound; benzimidazolon compound; thioindigo compound; and perylene compound. To be specific, C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254 are particularly preferable.

Examples of a blue pigment include copper phthalocyanine compounds or derivatives thereof such as alkali blue lake, Victoria blue lake, phthalocyanine blue, metal-free phthalocyanine blue, phthalocyanine blue partial chloride, fast sky blue, and indanthrene blue BG; anthraquinone compound; and basic dye lake compound. To be specific, C.I. Pigment Blue 1, 7, 15, 15:1, 15:2, 15:3, 15:4, 60, 62, and 66 are particularly preferable.

Examples of a violet pigment include fast violet B and methyl violet lake.

Examples of a green pigment include Pigment Green B, malachite green lake, and final yellow green G. Examples of a white pigment include zinc white, titanium oxide, antimony white, and zinc sulfide.

One of those colorants may be used alone, or two or more of them may be used as a mixture. Furthermore, each of the colorants can be used in the state of a solid solution.

In the present invention, attention must be paid to polymerization inhibiting properties and dispersion medium migration properties possessed by colorants for producing toner base particles by employing a polymerization method. The surfaces of colorants may be modified as required by subjecting them to surface treatment with a substance having no polymerization inhibiting properties. Particular attention should be paid when using dyes and carbon black, because many of them have polymerization inhibiting properties.

An example of a preferable method of treating dyes is a method in which a polymerizable monomer is polymerized in advance in the presence of these dyes. The resultant colored polymer is added to a polymerizable monomer composition. In addition, carbon black may be subjected to treatment with a substance that reacts with surface functional groups of carbon black (such as organosiloxane) as well as the same treatment as in the above dyes.

The toner of the present invention can be used as a non-magnetic toner or a magnetic toner. When the toner of the present invention is used as a magnetic toner, a magnetic material may be incorporated into the toner. A substance magnetized when placed in a magnetic field is used as the magnetic material, and examples of the substance include: powders of ferromagnetic metals such as iron, cobalt, and nickel; and powders of magnetic iron oxides such as magnetite and ferrite.

Attention must be paid to polymerization inhibiting properties, dispersion medium migration properties and the like possessed by magnetic materials when magnetic toner base particles are produced by employing a polymerization method. It is preferable to subject the magnetic materials to surface modification (such as surface treatment with a substance that does not inhibit polymerization) as required.

In the production of toner base particles, temperature may be increased in the latter half of the polymerization reaction. Alternatively, part of a dispersion medium may be distilled out of the reaction system in the latter half of the reaction or after the completion of the polymerization reaction for removing unreacted polymerizable monomers or by-products. After the completion of the reaction, produced toner base particles are washed, recovered by filtration, and dried.

In a suspension polymerization method, water is preferably used as a dispersion medium in an amount of 300 to 3,000 parts by mass with respect to 100 parts by mass of the polymerizable monomer composition.

Methods of measuring and evaluating physical properties concerning the toner of the present invention will be described below.

<DSC Measurement>

In the present invention, an M-DSC (manufactured by TA Instruments) is used as a differential scanning calorimeter (DSC). 6 mg of a toner sample to be measured are weighed. The sample is placed in an aluminum pan, and measured by using an empty aluminum pan as a reference in the measurement temperature range of 20 to 200° C. at a rate of temperature rise of 1° C./min and at normal temperature and normal humidity (24° C./60% RH). In this case, a modulation amplitude and a frequency are ±0.5° C. and 1/min, respectively. A glass transition point Tg (° C.) is calculated from the resultant reversing heat flow curve. The Tg is determined to be the central value of the intersections of the baselines before and after the heat absorption and the tangential line of the endothermic curve. In an endothermic chart at the time of temperature rise measured by DSC, a heat quantity integrated value (J/g) is measured which is found by converting an endotherm (J) represented by the peak area of an endothermic main peak into a heat quantity per 1 g of the toner. FIGURE shows an example of a reversing heat flow curve obtained from the DSC measurement of the toner.

The heat quantity integrated value (J/g) converted into a heat quantity per 1 g of toner is determined by using the reversing heat flow curve obtained from the above measurement. Analytical software Universal Analysis Ver. 2.5H (manufactured by TA Instruments) is used for calculation. The heat quantity integrated value is determined from the region surrounded by a line connecting measurement points at 40° C. and 130° C. and an endothermic curve by using the function of Integral Peak Linear.

<Measurement of Weight Average Particle Size of Toner Particles>

100 to 150 ml of an electrolytic solution (ISOTON-II; manufactured by Coulter Scientific Japan, Co.) are added with 0.1 to 5 ml of a surfactant (sodium dodecylbenzenesulfonate), and thereto, 2 to 20 mg of a measurement sample are added. The electrolyte solution with the sample suspended therein is dispersed by using an ultrasonic dispersing unit for 1 to 3 minutes. The particle size distribution of particles having a particle size of 2 to 40 μm on the basis of volume is measured by menas of a Coulter Multisizer (manufactured by Coulter Scientific Japan, Co.) using a 100 μm aperture, and the weight average particle size (D4) of the toner particles is calculated.

EXAMPLES

Hereinafter, the present invention will be described more specifically by way of examples. However, the present invention is not limited by these examples at all. It should be noted that the term "part(s)" to be used in the examples represents "part(s) by mass" unless otherwise stated.

(Synthesis Examples of Low-Molecular Weight Resins)

<Production Example of Styrene-type Resin (1)>

35 parts of xylene was placed in a pressure-resistant reactor equipped with a dropping funnel, a Liebig condenser and a stirrer, and heated to 205° C. The pressure at this time was 0.31 MPa. A mixture of 100 parts of styrene, 0.1 part of n-butyl acrylate and 3.5 parts of di-tert-butyl peroxide was placed in the dropping funnel, and was dropped into xylene at 205° C. over 2 hours under pressure (0.31 MPa). After the dropping, the reaction was further carried out at 205° C. for 2 hours. Then, solution polymerization was completed, and xylene was removed. The resultant resin had a weight average molecular weight of 3,150 and Tg of 55° C. The resin is designated as Styrene-type resin (1). Table 1 shows the physical properties of the resultant styrene-type resin.

<Production Examples of Styrene-type Resins (2) to (5)>

Solution polymerization was performed in the same manner as in the method of producing Styrene-type resin (1) except that the formulation and reaction conditions were changed as shown in Table 2, whereby each of Styrene-type resins (2) to (5) was obtained. Table 1 shows the physical properties of the resultant styrene-type resins.

<Production Example of Styrene-type Resin (6)>

35 parts of xylene was placed in a reactor equipped with a dropping funnel, a Liebig condenser, a nitrogen sealing pipe (nitrogen flow rate: 100 ml/min) and a stirrer, and heated to 135° C. A mixture of 99 parts of styrene, 0.1 part of n-butyl acrylate, 1 part of 2-ethylhexyl acrylate, 0.8 part of 2-isocyanatoethyl methacrylate, and 13 parts of di-tert-butyl peroxide was placed in the dropping funnel, and was dropped into xylene at 135° C. over 2 hours under normal pressure (101.3 kPa). The reaction was further carried out for 2 hours under the reflux of xylene (137 to 145° C.). Then, solution polymerization was completed, and xylene was removed. The resultant resin had a weight average molecular weight of 3,400 and Tg of 55° C. The resin is designated as Styrene-type resin (6). Table 1 shows the physical properties of the resultant styrene-type resin.

<Production Examples of Styrene-type Resins (7) to (10)>

Solution polymerization was performed in the same manner as in the method of producing Styrene-type resin (6)

except that the formulation and reaction conditions were changed as shown in Table 2, whereby each of Styrene-type resins (7) to (10) was obtained. Table 1 shows the physical properties of the resultant styrene-type resins.

<Production Example of Styrene-type Resin (11)>

A mixture of 45 parts of xylene, 80 parts of styrene, 20 parts of n-butyl acrylate, and 2 parts of di-tert-butyl peroxide as an initiator was placed in a reactor equipped with a Liebig condenser and a stirrer, and polymerization was performed under normal pressure at a polymerization temperature of 125° C. for 24 hours. After that, xylene was removed, whereby Styrene-type resin (11) was obtained. The resultant resin had a weight average molecular weight of 280,000 and Tg of 64° C. The resin is defined as Styrene-type resin (11). Table 1 shows the physical properties of the resultant styrene-type resin.

<Production Example of Styrene-type Resin (12)>

Solution polymerization was performed in the same manner as in the method of producing Styrene-type resin (11) except that the formulation and reaction conditions were changed as shown in Table 2, whereby Styrene-type resin (12) was obtained. Table 1 shows the physical properties of the resultant styrene-type resins.

Example 1

710 parts of ion-exchange water and 850 parts of a 0.1-mol/l aqueous solution of $Na_3PO_4$ were added to a four-necked container, and kept at 60° C. while being stirred by using a high-speed stirring device TK-Homomixer at 12,000 rpm. Thereto, 68 parts of a 1.0-mol/l aqueous solution of $CaCl_2$ were gradually added, whereby an aqueous dispersion medium containing a fine, hardly water-soluble dispersion stabilizer $Ca_3(PO_4)_2$ was prepared.

| | |
|---|---|
| Styrene | 124 parts |
| n-butyl acrylate | 36 parts |
| Copper phthalocyanine pigment (Pigment Blue 15:3) | 13 parts |
| Styrene-type resin (1) | 40 parts |
| Polyester-type resin (1) (terephthalic acid-propylene oxide-modified bisphenol A (2-mol adduct) (molar ratio = 51:50), acid value = 10 mgKOH/g, glass transition point = 70° C., Mw = 10,500, Mw/Mn = 3.20) | 10 parts |
| Negative charge control agent (aluminum compound of 3,5-di-tert-butylsalicylic acid) | 0.8 part |
| Wax (Fischer-Tropsch wax; endothermic main peak temperature = 78° C.) | 15 parts |

The above materials were stirred by using an Attritor for 3 hours, and the respective components were dispersed into a polymerizable monomer, whereby a monomer mixture was prepared. 20.0 parts of 1,1,3,3-tetramethylbutylperoxy-2-ethylhexanoate (toluene solution 50%) as a polymerization initiator was added to the monomer mixture, whereby a polymerizable monomer composition was prepared. The polymerizable monomer composition was placed in the aqueous dispersion medium, and granulated for 5 minutes while the number of revolutions of the stirring device was kept at 10,000 rpm. After that, the high-speed stirring device was changed to a propeller type agitator. The temperature in the container was increased to 70° C., and the reaction was carried out for 6 hours while being slowly stirred. Table 2 shows raw materials.

Next, the temperature in the container was increased to 80° C., and kept for 4 hours. After that, the temperature was gradually cooled to 30° C. at a cooling rate of 1° C./min, whereby Slurry 1 was obtained. Dilute hydrochloric acid was added to the container containing Slurry 1, and the dispersion stabilizer was removed. In addition, filtration, washing and drying were conducted, thereby obtaining polymer particles (Toner base particles 1) having a weight average particle size (D4) of 6.2 µm.

2.0 parts of hydrophobic silica having a specific surface area of 200 $m^2/g$ according to a BET method and 0.1 part of titanium oxide having a specific surface area of 100 $m^2/g$ according to a BET method were externally added to Toner base particles 1 (100 parts) obtained, whereby Toner particles (1) were obtained. The other physical properties of Toner particles (1) were measured. Table 1 shows the physical properties.

Table 1 shows the measurements of a molecular weight distribution chart of THF soluble matter in Toner particles (1) measured by GPC.

Table 4 shows the measurements of Toner particles (1) measured by a flow tester heat-up method.

<Fixation Test>

Unfixed toner images (0.5 $mg/cm^2$) were pressed against image-receiving paper (75 $g/m^2$) under heat in an oilless manner in the fixing temperature range of 110 to 250° C. at intervals of 5° C. and at a process speed of 120 mm/sec by using a remodeled fixing unit in which a fixing unit of a full-color laser beam printer (LBP-2510, manufactured by Canon Inc.) has been modified in such a manner that the fixing temperature of the fixing unit could be adjusted, whereby fixed images were formed on the image-receiving paper.

The fixed images were rubbed 10 times with KIMWIPE (S-200; manufactured by CRECIA Corporation) to which a load of 75 $g/cm^2$ was applied. The temperature region in which a density reduced by less than 5% after the rubbing as compared to that before the rubbing was defined as a fixable temperature region, and fixability was evaluated. Table 5 shows the evaluation results.

<Measurement of Image Density>

A fixed image portion was measured by using a Macbeth densitometer and an SPI auxiliary filter.

<Measurement of Endurance Image Density>

-In Case of Non-magnetic Toner-

A remodeled device of a full-color laser beam printer (LBP-2510, manufactured by Canon Inc.) (a process speed was modified to be 120 mm/sec) was used. 200 g of toner were set in a process cartridge under each of a low-temperature, low-humidity environment (16° C./15% RH), a normal-temperature, normal-humidity environment (24° C./60% RH) and a high-temperature, high-humidity environment (30° C./76% RH). A solid image was printed out on recording paper (75 $mg/cm^2$) at the initial stage. After that, images having a printing ratio of 2% were printed out on 10,000 sheets. After outputting the 10,000 sheets, a solid image was outputted. The density of the solid image at the initial stage and the density of the solid image at the time of outputting the 10,000 sheets were measured by using a Macbeth densitometer, and evaluated on the basis of the following criteria. Table 5 shows the evaluation results.

Rank A: 1.45 or more
Rank B: 1.44 to 1.40
Rank C, 1.39 to 1.35
Rank D: 1.34 to 1.30
Rank E: 1.29 to 1.25
Rank F: 1.24 or less -In Case of Magnetic Toner- A remodeled device of a full-color laser beam printer (LBP-2160, manufactured by Canon Inc.) (a process speed was modified to be 120 mm/sec) was used. 500 g of toner were set in a process cartridge under each of a low-temperature, low-humidity environment (16° C./15% RH), a normal-temperature, normal-humidity environment (24° C./60% RH), and a high-temperature, high-humidity environment (30° C./76% RH). A solid image was printed out on recording paper (75 mg/cm$^2$) at the initial stage. After that, images having a printing ratio of 2% were printed out on 10,000 sheets. After outputting the 10,000 sheets, a solid image was outputted. The density of the solid image at the initial stage and the density of the solid image at the time of outputting the 10,000 sheets were measured by using a Macbeth densitometer, and evaluated on the basis of the following criteria. Table 5 shows the evaluation results.

An unfixed image for evaluating the solid image density at the initial stage and an unfixed image for evaluating the solid image density at the time of outputting the 10,000 sheets were fixed by using a remodeled device of the LBP-2160. Other unfixed images were fixed by using a remodeled fixing unit of an LBP-2510 (manufactured by Canon Inc.) obtained by modifying a fixing unit of the LBP-2510 in such a manner that the fixing temperature of the unit could be adjusted as in the case of the non-magnetic toner.

Rank A: 1.45 or more
Rank B: 1.44 to 1.40
Rank C, 1.39 to 1.35
Rank D: 1.34 to 1.30
Rank E: 1.29 to 1.25
Rank F: 1.24 or less <Evaluation for Development Line Defect>

A half tone image (having an applied toner amount of 0.30 mg/cm$^2$) printed out after printing 10,000 sheets was evaluated for development line defects on the basis of the following criteria. Table 5 shows the evaluation results.

A: A vertical line in the sheet-discharge direction that appears to be a development line defect is not observed on both a developing roller and an image at a half tone portion. A level at which no problem in practical use occurs.

B: Although one to five thin lines in the circumferential direction are present on both ends of a developing roller, a vertical stripe in a sheet-discharge direction that appears to be a development line defect is not observed on an image at a half tone portion. A level at which no problem in practical use occurs.

C: Several thin lines in the circumferential direction are present on both ends of a developing roller, and several thin development line defects are observed on an image at a half tone portion.

D: A large number of development line defects are observed on a developing roller and an image at a half tone portion.

<Blocking Test>

10 g of toner particles were placed in a 100-ml glass bottle, and left standing at 45° C. and 50° C. for 10 days. After that, the toner particles were visually judged, and were ranked on the basis of the following criteria. Table 5 shows the evaluation results.

Rank A: No change.
Rank B: Aggregates are present, but can be readily loosened.
Rank C: Aggregates are present, and are hardly loosened.
Rank D: No fluidity.
Rank E: Apparent caking.

<Evaluation for Gloss>

Fixation was performed at a process speed of 120 mm/sec by using a remodeled fixing unit in which a fixing unit of a full-color laser beam printer (LBP-2510, manufactured by Canon Inc.) was modified in such a manner that the fixing temperature of the fixing unit could be adjusted in the range of 110 to 250° C. at intervals of 5° C. Unfixed toner images (0.5 mg/cm$^2$) were pressed against recording paper (75 g/m$^2$) under heat in an oilless manner by using the above remodeled fixing unit, whereby fixed images were formed on the recording paper.

The fixed images were rubbed 10 times with KIMWIPE (S-200; manufactured by CRECIA Corporation), to which a load of 75 g/cm$^2$ was applied. The temperature region in which a density reduced by less than 5% after the rubbing as compared to that before the rubbing was defined as a fixable temperature region, and evaluation for gloss was performed.

The gloss value (at an incident angle of light of 75°) of an image in a fixed image region was measured by using a handy glossmeter Gloss Checker IG-310 (manufactured by HORIBA, Ltd.). The highest gloss value in the fixed image region was defined as a gloss Max, and the fixing temperature at which the gloss Max was obtained was defined as a gloss Max fixing temperature (° C.). Table 5 shows the evaluation results.

Quantitative Determination of Double Bonds in Resin by Means of $^1$H-NMR Measurement The abundance ratio of double bonds in a resin was determined by observing hydrogen signals (each corresponding to 1H) of methine groups around 4.6 to 4.9 ppm and hydrogen signals (each corresponding to 1H) of a methine group around 5.0 to 5.2 ppm in a $^1$H-NMR spectrum.

(Measurement of $^1$H-NMR (Nuclear Magnetic Resonance) Spectrum)

Measuring Device: FT NMR Device JNM-EX 400 (Manufactured by JEOL)

Measurement frequency: 400 MHz

Pulse condition: 5.0 µs

Frequency range: 10,500 Hz

Number of integrations: 1,024 times

Measurement temperature: 60° C.

Sample: 50 mg of a measurement sample is placed in a sample tube having an inner diameter of 5 mm. CDCl$_3$ is added as a solvent, and dissolved in a thermostat at 40° C. to prepare a sample.

Examples 2 to 7

Toner particles (2) to (7) were each obtained in the same manner as in Example 1 except that formulation was changed as shown in Table 2, provided that when producing each of Toner particles (2), (3) and (5) to (7), the amount of hydrophobic silica to be added was changed to 0.8 part.

The molecular weight distributions of Toner particles (2) to (7) obtained were measured in the same manner as in Example 1. Table 2 shows the measurements.

In addition, Table 4 shows the measurements of Toner particles (2) to (7) measured by a flow tester heat-up method.

Toner particles (2) to (7) were each set in a process cartridge of a remodeled device of a laser beam printer (manufactured by Canon Inc.: LBP-2510) in the same manner as in Example 1, and subjected to image evaluation and fixation evaluation in the same manner as in Example 1. Table 5 shows the results of the image evaluation and the fixation evaluation.

Example 8

A ferrite carrier (500 parts) which had a volume average particle size of 40 μm and whose particle surfaces had been coated with a styrene-methyl methacrylate copolymer was added as a medium for stirring to Slurry 1 (100 parts) obtained in Example 1, and was uniformly stirred at 60° C. for 1 hour by using a stirring blade. After cooled to 30° C., the ferrite carrier was removed by using a magnet. Furthermore, dilute hydrochloric acid was added to the remaining polymer particles to remove a dispersion stabilizer. In addition, filtration, washing and drying were performed, whereby Toner base particles 8 were obtained.

0.8 parts of hydrophobic silica having a specific surface area of 200 m²/g according to a BET method and 0.1 part of titanium oxide having a specific surface of 100 m²/g area according to a BET method were externally added to Toner base particles 8 (100 parts), whereby Toner particles (8) were obtained.

The molecular weight distributions of Toner particles (8) obtained were measured in the same manner as in Example 1. Table 2 shows the measurements.

Table 4 shows the measurements of Toner particles (8) measured by a flow tester heat-up method.

Toner particles (8) were set in a process cartridge of a remodeled device of a laser beam printer (manufactured by Canon Inc.: LBP-2510) in the same manner as in Example 1, and subjected to image evaluation and fixation evaluation in the same manner as in Example 1. Table 5 shows the results of the image evaluation and the fixation evaluation.

Example 9

-Production of Hydrophobic Magnetic Iron Oxide-

An aqueous solution of ferrous sulfate was mixed with a caustic soda solution in an amount of 1.0 to 1.05 equivalents with respect to iron ions, whereby an aqueous solution containing ferrous hydroxide was prepared. The air was blown into the aqueous solution while the pH of the aqueous solution was kept at 8, and an oxidation reaction was performed at 85 to 90° C., whereby a slurry liquid for producing seed crystals was prepared. Next, the slurry liquid was added with an aqueous solution of ferrous sulfate in an amount of 0.9 to 1.15 equivalents with respect to the initial alkali amount (sodium component of caustic soda). After that, the pH of the slurry liquid was kept at 8, and an oxidation reaction was allowed to proceed while the air was blown into the liquid. The pH of the liquid was adjusted to about 6 at the terminal stage of the oxidation reaction and the oxidation reaction was completed. The produced iron oxide particles were washed, filtered, and taken out, and were re-dispersed into another water without being dried. The pH of the re-dispersion liquid was adjusted, and added with an n-hexyltrimethoxysilane coupling agent in an amount of 2.5 parts with respect to 100 parts of magnetic iron oxide while the liquid was sufficiently stirred. Then, the resultant was sufficiently stirred. The produced hydrophobic iron oxide particles were washed, filtered, and dried. Next, aggregating particles were finely broken, thereby obtaining hydrophobic magnetic iron oxide having a number average particle size of 0.17 μm.

710 parts of ion-exchange water and 850 parts of a 0.1-mol/l aqueous solution of $Na_3PO_4$ were added to a four-necked container, and was kept at 60° C. while being stirred by using a high-speed stirring device TK-Homomixer at 12,000 rpm. Thereto, 68 parts of a 1.0-mol/l aqueous solution of $CaCl_2$ were gradually added to prepare an aqueous dispersion medium containing a fine, hardly water-soluble dispersion stabilizer $Ca_3(PO_4)_2$.

| | |
|---|---|
| Styrene | 124 parts |
| n-butyl acrylate | 36 parts |
| hydrophobic magnetic iron oxide | 190 parts |
| Styrene-type resin (1) | 40 parts |
| Polyester-type resin (1) (terephthalic acid-propylene oxide-modified bisphenol A (2-mol adduct) (molar ratio = 51:50), acid value = 10, glass transition point = 70° C., Mw = 10,500, Mw/Mn = 3.20) | 10 parts |
| Negative charge control agent (aluminum compound of 3,5-di-tert-butylsalicylic acid) | 0.8 part |
| Wax (Fischer-Tropsch wax (1); mp = 78° C.) | 15 parts |

The above monomer mixture was dispersed by using an Attritor for 3 hours. After that, the polymerizable monomer composition in which 8 parts of 1,1,3,3-tetramethylbutylperoxy-2-ethylhexanoate (toluene solution 50%) was added as a polymerization initiator was placed in the aqueous dispersion medium, and was granulated for 5 minutes while the number of revolutions of the stirring device was kept at 10,000 rpm. After that, the high-speed stirring device was changed to a propeller type agitator. The temperature in the container was increased to 80° C., and the reaction was carried out for 8 hours with slow stirring. Table 2 shows raw materials.

Next, the temperature was gradually cooled to 30° C. at a cooling rate of 1° C./min, whereby Slurry 2 was obtained. Dilute hydrochloric acid was added to the container containing Slurry 2, and the dispersion stabilizer was removed. In addition, filtration, washing and drying were conducted, thereby obtaining polymer particles (Toner base particles 9) having a weight average particle size of 5.7 μm.

1.0 part of hydrophobic silica having a specific surface area of 120 m²/g according to a BET method was externally added to Toner base particles 9 (100 parts) obtained, whereby Toner particles (9) were obtained. The other physical properties of Toner particles (9) were measured. Table 2 shows the obtained measurements.

Table 2 shows the measurements of a molecular weight distribution chart of THF soluble matter in Toner particles (9) measured by GPC.

Table 4 shows the measurements of Toner particles (9) measured by a flow tester heat-up method.

An 8,000-sheet image output test was performed by using a remodeled device of an LBP-2160 (manufactured by Canon Inc.) (a fixing device was removed and a process speed was modified to be 120 mm/sec) as an image forming device at normal temperature and normal humidity.

Unfixed images were outputted by using a remodeled device of an LBP-2160, and fixed by using a remodeled fixing unit of an LBP-2510 (manufactured by Canon Inc.) in which a fixing unit of the LBP-2510 was modified in such a manner that the fixing temperature of the fixing unit could be adjusted as in the case of Example 1.

700 g of Toner particles (9) was placed a process cartridge, and images having a printing ratio of 2% were printed out on 10,000 sheets under each of a low-temperature, low-humidity environment (16° C./15% RH), a normal-temperature, normal-humidity environment (24° C./60% RH), and a high-temperature, high-humidity environment (30° C./78% RH). Then, the solid image density at the initial stage and the solid image density at the time of outputting the 10,000 sheets were evaluated. Table 5 shows the results. Next, fixation evaluation was performed. Table 5 shows the results of the fixation evaluation as well.

Example 10

Toner base particles 10 were obtained in the same manner as in Example 1 except that the formulation was changed as shown in Table 2.

0.8 part of hydrophobic silica having a specific surface area of 200 m$^2$/g according to a BET method and 0.1 part of titanium oxide having a specific surface area of 100 m$^2$/g according to the BET method were externally added to Toner base particles 10 (100 parts), whereby Toner particles (10) were obtained.

The molecular weight distribution of Toner particles (10) obtained was measured in the same manner as in Example 1. Table 2 shows the measurements.

In addition, Table 4 shows the measurements of Toner particles (10) measured by a flow tester heat-up method.

Toner particles (10) were set in a process cartridge of a remodeled device of a laser beam printer (manufactured by Canon Inc.: LBP-2510) in the same manner as in Example 1, and subjected to image evaluation and fixation evaluation in the same manner as in Example 1. Table 5 shows the results of the image evaluation and the fixation evaluation.

Comparative Examples 1 to 6

Toner particles (13) to (15) were each obtained in the same manner as in Example 1 except that the formulations were changed as shown in Table 2, provided that in the preparation of Toner particles (13) to (15), the amount of hydrophobic silica to be added was changed to 0.8 part.

The molecular weight distributions of Toner particles (11) to (16) obtained were measured in the same manner as in Example 1. Table 2 shows the measurements.

In addition, Table 4 shows the measurements of Toner particles (11) to (16) measured by a flow tester heat-up method.

Toner particles (11) to (16) were each set in a process cartridge of a remodeled device of a laser beam printer (manufactured by Canon Inc.: LBP-2510) in the same manner as in Example 1, and were each subjected to image evaluation and fixation evaluation in the same manner as in Example 1. Table 5 shows the results.

Comparative Example 7

| | |
|---|---|
| Styrene-type resin (10) | 160 parts |
| Styrene-type resin (11) | 40 parts |
| Polyester-type resin (1) (terephthalic acid-propylene oxide-modified bisphenol A (2-mol adduct) (molar ratio = 51:50), acid value = 10, glass transition point = 70° C., Mw = 10,500, Mw/Mn = 3.20) | 10 parts |
| Copper phthalocyanine pigment | 13 parts |
| Negative charge control agent (aluminum compound of 3,5-di-tert-butylsalicylic acid) | 1 part |
| Wax (Fischer-Tropsch wax; endothermic main peak temperature = 78° C.) | 15 parts |

The above materials were mixed by using a Henschel mixer. After that, the mixture was melted and kneaded by using a biaxial kneading extruder at 130° C., and the kneaded product was cooled. After that, the cooled kneaded product was coarsely ground by using a cutter mill, then finely pulverized by using a pulverizer utilizing a jet stream, and further classified by using an air classifier, whereby Toner base particles 17 having a weight average particle size of 6.7 µm were obtained.

2.0 parts of hydrophobic silica having a specific surface area of 200 m$^2$/g according to a BET method and 0.1 part of titanium oxide having a specific surface of 100 m$^2$/g area according to a BET method were externally added to Toner base particles 17 (100 parts) obtained, whereby Toner particles (17) were obtained. Table 2 shows the physical properties of Toner particles (17).

The molecular weight distributions of Toner particles (17) obtained were measured in the same manner as in Example 1. Table 2 shows the measurements.

In addition, Table 4 shows the measurements of Toner particles (17) measured by a flow tester heat-up method.

Toner particles (17) were set in a process cartridge of a remodeled device of a laser beam printer (manufactured by Canon Inc.: LBP-2510) in the same manner as in Example 1, and subjected to image evaluation and fixation evaluation in the same manner as in Example 1. Table 5 shows the results of the image evaluation and the fixation evaluation.

Comparative Example 8

Toner base particles 18 were obtained in the same manner as in Comparative Example 7 except that 180 parts of Styrene-type resin (4) and 20 parts of Styrene-type resin (12) were used as styrene-type resins.

2.0 parts of hydrophobic silica having a specific surface area of 200 m$^2$/g according to a BET method and 0.1 part of titanium oxide having a specific surface area of 100 m$^2$/g according to a BET method were externally added to Toner base particles 18 (100 parts) obtained, whereby Toner particles (18) were obtained. Table 2 shows the physical properties.

The molecular weight distribution of Toner particles (18) obtained were measured in the same manner as in Example 1. Table 2 shows the measurement.

In addition, Table 4 shows the measurement of Toner particles (18) measured by a flow tester heat-up method.

Toner particles (18) were set in a process cartridge of a remodeled device of a laser beam printer (manufactured by Canon Inc.: LBP-2510) in the same manner as in Example 1, and subjected to image evaluation and fixation evaluation in the same manner as in Example 1. Table 5 shows the results of the image evaluation and the fixation evaluation.

Comparative Examples 9 and 10

Toner base particles 19 and 20 were obtained in the same manner as in Example 1 except that the formulations were changed as shown in Table 2.

2.0 parts of hydrophobic silica having a specific surface area of 200 m$^2$/g according to the BET method and 0.1 parts of titanium oxide having a specific surface area of 100 m$^2$/g according to the BET method were externally added to 100 parts of each of Toner base particles 19 and 20, whereby Toner particles (19) and (20) were obtained. Table 2 shows the physical properties of Toner particles (19) and (20).

The molecular weight distributions of Toner particles (19) and (20) obtained were measured in the same manner as in Example 1. Table 2 shows the measurements.

In addition, Table 4 shows the measurements of Toner particles (19) and (20) measured by a flow tester heat-up method.

Toner particles (19) and (20) were each set in a process cartridge of a remodeled device of a laser beam printer (manufactured by Canon Inc.: LBP-2510) in the same manner as in Example 1, and subjected to image evaluation and fixation evaluation in the same manner as in Example 1. Table 5 shows the results of the image evaluation and the fixation evaluation.

Comparative Example 11

(Preparation of Dispersion Liquid of Colorant Fine Particles)

0.90 parts of sodium n-dodecylsulfate "ADEKA HOPE LS-90" (manufactured by ADEKA CORPORATION) and 10.0 parts of ion-exchange water were placed in a resin container, and this system was stirred to prepare an aqueous solution of sodium n-dodecylsulfate. 1.2 parts of carbon black (REGAL 330R, manufactured by CABOT) was gradually added while the aqueous solution was stirred. After the addition, the resulting mixture was stirred for 1 hour. Next, the carbon black was subjected to continuous dispersion process over 20 hours by using a medium type dispersing device, whereby a dispersion liquid of colorant fine particles (hereinafter referred to as "Colorant dispersion liquid (C)") was prepared. The particle size of the colorant fine particles in Colorant dispersion liquid (C) was measured by using an electrophoresis light scattering photometer "ELS-800" (manufactured by OTSUKA ELECTRONICS CO., LTD.). As a result, the fine particles had a weight average particle size of 122 nm. In addition, the solid content of Colorant dispersion liquid (C) measured by a gravimetric method based on static drying was 16.6 mass %.

(Preparation of Dispersion Liquid of Release Agent Fine Particles)

Polypropylene (PP) produced by an ordinary synthesis method was thermally decomposed in a thermally molten state, thereby obtaining release agent fine particles of polypropylene.

1.05 kg of the resultant polypropylene was added to 2.45 kg of an aqueous solution of a surfactant (nonylphenoxyethanol), and the pH of the mixture was adjusted to 9 by using potassium hydroxide. The temperature of the system was increased under pressure to a temperature equal to or higher than the softening point of the release agent, and then the release agent was subjected to emulsion dispersion process, whereby a dispersion liquid of release agent particles having a solid content of 30 mass % was prepared. The dispersion liquid was referred to as "Release agent dispersion liquid W1".

(Preparation of Aqueous Solution of Surfactant)

(Preparation example (S-1)): 0.055 parts of dodecylbenzenesulfonic acid (anionic surfactant, manufactured by KANTO CHEMICAL CO., INC.) and 4.0 parts of ion-exchange water were put into a stainless pot, and stirred to prepare an anionic surfactant aqueous solution (hereinafter referred to as "Surfactant solution (S-1)").

(Preparation example (S-2)): 0.014 parts of nonionic surfactant (NEWCOL 565C, manufactured by Nippon Nyukazai Co., Ltd.) and 4.0 parts of ion-exchange water were put into a stainless pot, and stirred to prepare a nonionic surfactant aqueous solution (hereinafter referred to as "Surfactant solution (S-2)").

(Preparation example (S-3)): 1.00 part of nonionic surfactant (FC-170C, manufactured by Sumitomo 3M) and 1,000 parts of ion-exchange water were put into a glass beaker, and stirred to prepare a nonionic surfactant aqueous solution (hereinafter referred to as "Surfactant solution (S-3)").

(Preparation of Aqueous Solution of Polymerization Initiator)

Preparation example (P-1)): 200.7 parts of potassium persulfate (polymerization initiator, manufactured by KANTO CHEMICAL CO., INC.) and 12,000 parts of ion-exchange water were put into an enameled pot, and stirred at room temperature to prepare a polymerization initiator aqueous solution (hereinafter referred to as "Initiator solution (p-1)").

(Preparation example (P-2)): 223.3 parts of potassium persulfate (polymerization initiator, manufactured by KANTO CHEMICAL CO., INC.) and 12,000 parts of ion-exchange water were put into an enameled pot, and stirred at room temperature to prepare a polymerization initiator aqueous solution (hereinafter referred to as "Initiator solution (p-2)").

(Preparation of Aqueous Solution of Sodium Chloride)

5.36 parts of sodium chloride as a salting-out agent (manufactured by Wako Pure Chemical Industries Ltd.) and 20.0 parts of ion-exchange water were put into a stainless pot, and stirred at room temperature to prepare a sodium chloride aqueous solution (hereinafter referred to as "Sodium chloride solution (N)").

(Production of Toner Base Particles)

Production Example (1)

(i) Preparation of dispersion liquid of Resin fine particles (A): 4.0 liters of Surfactant solution (S-1) and 4.0 liters of Surfactant solution (S-2) were put into a reaction vessel having an inner volume of 100 liters which was provided with a temperature sensor, a cooling pipe, a nitrogen introducing device and a stirring blade, and whose inside had been subjected to glass lining process. Thereto, 44.0 liters of ion-exchange water was added with stirring at room temperature, and this system was heated. When the temperature of the system came to be 75° C., 12.0 liters of Initiator solution (P-2) was added. While the temperature of the system was so controlled as to be 75° C.±1° C., a monomer mixture composed of 12.0 kg of styrene, 2.9 kg of n-butyl acrylate, 1.0 kg of methacrylic acid and 550 g of t-dodecyl mercaptan was added over 180 minutes by means of a liquid feed pump equipped with a quantity meter, and was stirred for 5 hours while the temperature of this system was so controlled as to be 80° C.±1° C. After that, the system was cooled to 40° C. or lower and the stirring was stopped, and scale (extraneous substance) was filtered off by means of a pole filter, thereby preparing a dispersion liquid of Resin fine particles (A) composed of low molecular weight resin (hereinafter referred to as "Low molecular weight latex (A)"). The resin fine particles constituting this Low molecular weight latex (A) had a weigh average particle diameter of 105 nm.

(ii) Preparation of dispersion liquid of Resin fine particles (B): 4.0 liters of Surfactant solution (S-1) and 4.0 liters of Surfactant solution (S-2) were put into a reaction vessel having an inner volume of 100 liters which was provided with a temperature sensor, a cooling pipe, a nitrogen introducing device and a stirring blade, and whose inside had been subjected to glass lining process. Thereto, 44.0 liters of ion-exchange water was added with stirring at room temperature, and this system was heated. When the temperature of the system came to be 70° C., 12.0 liters of Initiator solution (P-1) was added. While the temperature of the system was so controlled as to be 70° C.±1° C., a monomer mixture composed of 11.0 kg of styrene, 4.00 kg of n-butyl acrylate, 1.0 kg of methacrylic acid and 9.0 g of t-dodecyl mercaptan was added over 180 minutes by means of a liquid feed pump equipped with a quantity meter, and was stirred for 5 hours while the temperature of this system was so controlled as to be 72°

C.±2° C., and further stirred for 12 hours while the temperature of this system was so controlled as to be 80° C.±2° C. After that, the system was cooled to 40° C. or lower and the stirring was stopped, and scale (extraneous substance) was filtered off by means of a pole filter, thereby preparing a dispersion liquid of Resin fine particles (B) composed of low molecular weight resin (hereinafter referred to as "High molecular weight latex (B)"). The resin fine particles constituting this High molecular weight latex (B) had a weigh average particle diameter of 102 nm.

(iii) Production of toner base particles (salting-out/melt adhesion step): 20.0 kg of Low molecular weight latex (A), 5.0 kg of High molecular weight latex (B), 0.4 kg of Colorant dispersion liquid (C), 1.02 kg of Release agent dispersion liquid (W1) and 20.0 kg of ion-exchange water were put into a stainless reaction vessel having an inner volume of 100 liters which was provided with a temperature sensor, a cooling pipe, a nitrogen introducing device, a comb-shaped baffle and a stirring blade (anchor blade). This system was stirred at room temperature. The temperature of the system was heated to 40° C., and thereto, 20 liters of Sodium chloride solution (N), 6.00 kg of isopropyl alcohol (manufactured by KANTO CHEMICAL CO., INC.) and 1.0 liter of Surfactant solution (S-3) in this order were added. This system was left standing for 10 minutes, and then, heated to 85° C. over 60 minutes, and stirred at 85° C.±2° C. for 6 hours, thereby subjecting resin particles composed of high molecular weight resin, resin particles composed of low molecular weight resin, colorant fine particles and release agent fine particles (PP for use in the present invention) to salting-out/melt adhesion to produce toner base particles. The temperature of the system was cooled to 40° C. or lower, and the stirring was stopped. After that, agglomerate was filtered off by means of a filter having an opening of 45 μm, thereby obtaining a dispersion liquid of toner base particles. Subsequently, wet cake (agglomerate of toner base particles) was separated from the resulting dispersion liquid by vacuum filtration using a suction funnel, and washed with ion-exchange water. The washed wet cake was taken out of the suction funnel, and while being finely broken, spread on five sheets of full-page pads, and covered with kraft paper, followed by drying at 40° C. over 100 hours by means of an air blowing dryer, thereby obtaining agglomerate of block-like toner base particles. Subsequently, the agglomerate obtained was disintegrated by means of a Henschel disintegrator to produce Toner base particles 21.

To 100 parts of the toner base particles, 0.8 parts of hydrophobic silica having a specific surface area of 200 $m^2/g$ according to the BET method and 0.1 parts of titanium oxide having a specific surface area of 100 $m^2/g$ according to the BET method were externally added to produce Toner particles (21). The physical properties of Toner particles (21) are shown in Table 6.

The molecular weight distribution of Toner particles (21) obtained was measured in the same manner as in Example 1. Table 6 shows the measurements.

In addition, Table 4 shows the measurements of Toner particles (21) measured by a flow tester heat-up method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-067100, filed Mar. 13, 2006, which is hereby incorporated by reference herein in its entirety.

TABLE 1

|  |  |  | Low-molecular weight resin No. | | | | | | |
|---|---|---|---|---|---|---|---|---|---|
|  |  |  | (1) | (2) | (3) | (4) | (5) | (6) | (7) |
| Composition ratio | Styrene | Parts by mass | 100 | 94 | 83 | 100 | 100 | 99 | 100 |
|  | n-butyl acrylate | Parts by mass | 0.1 | 6 | 17 | — | 0.1 | 0.1 | 0.1 |
|  | 2-ethylhexyl acrylate | Parts by mass | — | — | — | — | — | 1 | — |
|  | 2-isocyanatoethyl methacrylate | Parts by mass | — | — | — | — | — | 0.8 | — |
|  | Di-tert-butyl peroxide | Parts by mass | 3.5 | 3.5 | 1 | 3 | 3.5 | 13 | 13 |
|  | Divinylbenzene | Parts by mass | — | — | — | — | — | — | — |
| Reaction conditions | Xylene | Parts by mass | 35 | 35 | 10 | 30 | 40 | 600 | 600 |
|  | Reaction temperature (° C.) |  | 205 | 205 | 200 | 205 | 240 | 135 | 135 |
|  | Pressure (MPa) |  | 0.31 | 0.31 | 0.31 | 0.31 | 0.31 | 0.1 | 0.1 |
| Weight average molecular weight Mw |  |  | 3,150 | 3,200 | 31,000 | 4,400 | 2,900 | 3,400 | 3,200 |
| Weight average molecular weight Mw/number average molecular weight Mn |  |  | 1.17 | 1.31 | 7.50 | 1.18 | 1.20 | 1.32 | 1.20 |
| Glass transition point (° C.) |  |  | 55 | 45 | 63 | 60 | 54 | 55 | 55 |
| $^1$H-NMR | Presence or absence of peak in each of range of 4.6 to 4.9 ppm and range of 5.0 to 5.2 ppm |  | Present | Present | Present | Present | Present | Absent | Absent |

|  |  |  | Low-molecular weight resin No. | | | | |
|---|---|---|---|---|---|---|---|
|  |  |  | (8) | (9) | (10) | (11) | (12) |
| Composition ratio | Styrene | Parts by mass | 94 | 83 | 100 | 80 | 80 |
|  | n-butyl acrylate | Parts by mass | 6 | 17 | — | 20 | 20 |
|  | 2-ethylhexyl acrylate | Parts by mass | — | — | — | — | — |
|  | 2-isocyanatoethyl methacrylate | Parts by mass | — | — | — | — | — |
|  | Di-tert-butyl peroxide | Parts by mass | 13 | 5 | 10 | 2 | 1.5 |
|  | Divinylbenzene | Parts by mass | — | — | — | 0.18 | 0.2 |

TABLE 1-continued

|  |  |  |  |  |  |  |  |
|---|---|---|---|---|---|---|---|
| Reaction conditions | Xylene | Parts by mass | 600 | 600 | 600 | 45 | 45 |
|  | Reaction temperature (° C.) |  | 135 | 135 | 135 | 125 | 125 |
|  | Pressure (MPa) |  | 0.1 | 0.1 | 0.1 | 0.1 | 0.1 |
| Weight average molecular weight Mw |  |  | 3,300 | 30,000 | 4,500 | 280,000 | 410,000 |
| Weight average molecular weight Mw/number average molecular weight Mn |  |  | 1.31 | 8.40 | 1.19 | 13.10 | 12.80 |
| Glass transition point (° C.) |  |  | 45 | 62 | 60 | 64 | 65 |
| $^1$H-NMR | Presence or absence of peak in each of range of 4.6 to 4.9 ppm and range of 5.0 to 5.2 ppm |  | Absent | Absent | Absent | Absent | Absent |

TABLE 2

|  |  |  | Example 1 | Example 2 | Example 3 | Example 4 | Example 5 |
|---|---|---|---|---|---|---|---|
|  |  |  | Toner base particles ||||| 
|  |  |  | Toner base particles 1 | Toner base particles 2 | Toner base particles 3 | Toner base particles 4 | Toner base particles 5 |
| Monomer | Styrene | Parts by mass | 124.0 | 124.0 | 124.0 | 124.0 | 124.0 |
|  | n-butyl acrylate | Parts by mass | 36.0 | 36.0 | 36.0 | 36.0 | 36.0 |
|  | Divinylbenzene | Parts by mass | 0.12 | 0.12 | 0.12 | 0.12 | 0.12 |
| Low-molecular weight resin | Styrene-type resin | Type | (1) | (2) | (3) | (4) | (5) |
|  |  | Parts by mass | 40 | 40 | 40 | 40 | 40 |
|  |  | Weight average molecular weight Mw | 3,150 | 3,200 | 31,000 | 4,400 | 2,900 |
|  |  | Glass transition point (° C.) | 55 | 45 | 63 | 60 | 54 |
|  |  | Composition | St/BA | St/BA | St/BA | St | St/BA |
| Polar resin | Polyester-type resin | Kind | (1) | (1) | (1) | (1) | (1) |
|  |  | Parts by mass | 10 | 10 | 10 | 10 | 10 |
|  |  | Weight average molecular weight Mw | 10,500 | 10,500 | 10,500 | 10,500 | 10,500 |
| Wax |  | Type | Fischer-Tropsch | Fischer-Tropsch | Fischer-Tropsch | Fischer-Tropsch | Fischer-Tropsch |
|  |  | Parts by mass | 15 | 15 | 15 | 15 | 15 |
| Colorant | Copper phthalocyanine | Parts by mass | 13 | 13 | 13 | 13 | 13 |
|  | Iron oxide | Parts by mass | — | — | — | — | — |
| Negative charge control agent |  | Parts by mass | 0.8 | 0.8 | 0.8 | 0.8 | 0.8 |
| Initiator | 1,1,3,3-tetramethylbutylperoxy-2-ethylhexanoate | Parts by mass | 20.0 | 20.0 | 20.0 | 20.0 | 20.0 |
|  | t-butylperoxy neodecanoate | Parts by mass | — | — | — | — | — |
| Polymerization condition | Before switching | Temperature | 70 | 70 | 70 | 70 | 70 |
|  |  | Retention time (hours) | 6 | 6 | 6 | 6 | 6 |
|  | After switching | Temperature | 80 | 80 | 80 | 80 | 80 |
|  |  | Retention time (hours) | 4 | 4 | 4 | 4 | 4 |
| Toner |  |  | Toner particles (1) | Toner particles (2) | Toner particles (3) | Toner particles (4) | Toner particles (5) |
| Toner physical properties | THF insoluble matter (%) |  | 18.2 | 18.4 | 19.1 | 18.7 | 18.7 |
|  | Average circularity |  | 0.986 | 0.983 | 0.972 | 0.982 | 0.984 |
|  | Mode circularity |  | 1.00 | 1.00 | 1.00 | 1.00 | 1.00 |
|  | Weight average molecular weight Mw |  | 47,000 | 48,000 | 78,000 | 47,000 | 53,000 |
|  | Weight average particle size (μm) |  | 5.8 | 5.7 | 5.8 | 5.8 | 5.8 |
|  | Endothermic main peak temperature (° C.) |  | 70.3 | 70.3 | 70.4 | 70.4 | 70.3 |
|  | Heat quantity integrated value (J/g) |  | 19.8 | 19.7 | 19.8 | 19.8 | 19.7 |
|  | Glass transition point (° C.) |  | 59.2 | 58.5 | 59.0 | 58.9 | 59.1 |

|  |  |  | Example 6 | Example 7 | Example 8 | Example 9 | Example 10 |
|---|---|---|---|---|---|---|---|
|  |  |  | Toner base particles ||||| 
|  |  |  | Toner base particles 6 | Toner base particles 7 | Toner base particles 8 | Toner base particles 9 | Toner base particles 10 |
| Monomer | Styrene | Parts by mass | 124.0 | 124.0 | 124.0 | 124.0 | 124.0 |
|  | n-butyl acrylate | Parts by mass | 36.0 | 36.0 | 36.0 | 36.0 | 36.0 |
|  | Divinylbenzene | Parts by mass | 0.12 | 0.12 | 0.12 | 0.12 | 0.12 |

TABLE 2-continued

|  |  |  | | | | | |
|---|---|---|---|---|---|---|---|
| Low-molecular weight resin | Styrene-type resin | Type | (1) | (1) | (6) | (1) | (1) |
|  |  | Parts by mass | 40 | 40 | 40 | 40 | 40 |
|  |  | Weight average molecular weight Mw | 3,150 | 3,150 | 3,400 | 3,150 | 3,150 |
|  |  | Glass transition point (° C.) | 55 | 55 | 55 | 55 | 55 |
|  |  | Composition | St/BA | St/BA | St/BA/HEMA | St/BA | St/BA |
| Polar resin | Polyester-type resin | Kind | — | (2) | (1) | (1) | (1) |
|  |  | Parts by mass | — | 10 | 10 | 10 | 10 |
|  |  | Weight average molecular weight Mw | — | 11,000 | 10,500 | 10,500 | 10,500 |
| Wax |  | Type | Fischer-Tropsch | Fischer-Tropsch | Fischer-Tropsch | Fischer-Tropsch | Fischer-Tropsch |
|  |  | Parts by mass | 15 | 15 | 15 | 15 | 15 |
| Colorant | Copper phthalocyanine | Parts by mass | 13 | 13 | 13 | — | 13 |
|  | Iron oxide | Parts by mass | — | — | — | 190 | — |
| Negative charge control agent |  | Parts by mass | 0.8 | 0.8 | 0.8 | 0.8 | 0.8 |
| Initiator | 1,1,3,3-tetramethylbutylperoxy-2-ethylhexanoate | Parts by mass | 20.0 | 20.0 | 20.0 | 8.0 | 30.0 |
|  | t-butylperoxy neodecanoate | Parts by mass | — | — | — | — | — |
| Polymerization condition | Before switching | Temperature | 70 | 70 | 70 | 80 | 70 |
|  |  | Retention time (hours) | 6 | 6 | 6 | 8 | 6 |
|  | After switching | Temperature | 80 | 80 | 80 | — | 80 |
|  |  | Retention time (hours) | 4 | 4 | 4 | — | 4 |
| Toner |  |  | Toner particles (6) | Toner particles (7) | Toner particles (8) | Toner particles (9) | Toner particles (10) |
| Toner physical properties | THF insoluble matter (%) |  | 19.2 | 19.0 | 18.9 | 19.4 | 16.2 |
|  | Average circularity |  | 0.971 | 0.988 | 0.972 | 0.98 | 0.981 |
|  | Mode circularity |  | 0.99 | 1.00 | 1.00 | 1.00 | 1.00 |
|  | Weight average molecular weight Mw |  | 46,000 | 46,000 | 47,000 | 40,000 | 34,000 |
|  | Weight average particle size (μm) |  | 5.8 | 5.8 | 5.8 | 5.7 | 5.8 |
|  | Endothermic main peak temperature (° C.) |  | 70.4 | 70.3 | 70.4 | 69.8 | 70.4 |
|  | Heat quantity integrated value (J/g) |  | 19.7 | 19.8 | 19.7 | 12.4 | 19.7 |
|  | Glass transition point (° C.) |  | 58.3 | 59.1 | 59.4 | 59.7 | 57.2 |

|  |  |  | Comparative Example 1 | Comparative Example 2 | Comparative Example 3 | Comparative Example 4 | Comparative Example 5 |
|---|---|---|---|---|---|---|---|
|  |  |  | Toner base particles | | | | |
|  |  |  | Toner base particles 11 | Toner base particles 12 | Toner base particles 13 | Toner base particles 14 | Toner base particles 15 |
| Monomer | Styrene | Parts by mass | 124.0 | 124.0 | 124.0 | 124.0 | 124.0 |
|  | n-butyl acrylate | Parts by mass | 36.0 | 36.0 | 36.0 | 36.0 | 36.0 |
|  | Divinylbenzene | Parts by mass | 0.12 | 0.12 | 0.12 | 0.12 | 0.5 |
| Low-molecular weight resin | Styrene-type resin | Type | (7) | (8) | (9) | (10) | (7) |
|  |  | Parts by mass | 40 | 40 | 40 | 40 | 40 |
|  |  | Weight average molecular weight Mw | 3,200 | 3,300 | 30,000 | 4,500 | 3,200 |
|  |  | Glass transition point (° C.) | 55 | 45 | 62 | 60 | 55 |
|  |  | Composition | St/BA | St/BA | St/BA | St | St/BA |
| Polar resin | Polyester-type resin | Type | (1) | (1) | (1) | (1) | (1) |
|  |  | Parts by mass | 10 | 10 | 10 | 10 | 10 |
|  |  | Weight average molecular weight Mw | 10,500 | 10,500 | 10,500 | 10,500 | 10,500 |
| Wax |  | Type | Fischer-Tropsch | Fischer-Tropsch | Fischer-Tropsch | Fischer-Tropsch | Fischer-Tropsch |
|  |  | Parts by mass | 15 | 15 | 15 | 15 | 15 |
| Colorant | Copper phthalocyanine | Parts by mass | 13 | 13 | 13 | 13 | 13 |
|  | Iron oxide | Parts by mass | — | — | — | — | — |

TABLE 2-continued

|  |  |  |  |  |  |  |  |
|---|---|---|---|---|---|---|---|
| Negative charge control agent |  | Parts by mass | 0.8 | 0.8 | 0.8 | 0.8 | 0.8 |
| Initiator | 1,1,3,3-tetramethylbutylperoxy-2-ethylhexanoate | Parts by mass | 5.0 | 5.0 | 20.0 | 5.0 | 20.0 |
|  | t-butylperoxy-neodecanoate | Parts by mass | — | — | — | — | — |
| Polymerization condition | Before switching | Temperature | 70 | 70 | 70 | 70 | 70 |
|  |  | Retention time (hours) | 6 | 6 | 6 | 6 | 6 |
|  | After switching | Temperature | 80 | 80 | 80 | 80 | 80 |
|  |  | Retention time (hours) | 4 | 4 | 4 | 4 | 4 |
| Toner |  |  | Toner particles (11) | Toner particles (12) | Toner particles (13) | Toner particles (14) | Toner particles (15) |
| Toner physical properties | THF insoluble matter (%) |  | 12.4 | 12.6 | 12.4 | 12.1 | 38.2 |
|  | Average circularity |  | 0.982 | 0.981 | 0.982 | 0.983 | 0.982 |
|  | Mode circularity |  | 1.00 | 1.00 | 1.00 | 1.00 | 1.00 |
|  | Weight average molecular weight Mw |  | 54,000 | 56,000 | 56,000 | 57,000 | 63,000 |
|  | Weight average particle size (μm) |  | 5.8 | 5.7 | 5.8 | 5.8 | 5.8 |
|  | Endothermic main peak temperature (° C.) |  | 70.3 | 70.4 | 70.3 | 70.4 | 70.4 |
|  | Heat quantity integrated value(J/g) |  | 19.6 | 19.7 | 19.6 | 19.7 | 19.6 |
|  | Glass transition point(° C.) |  | 58.2 | 58.1 | 58.7 | 58.3 | 58.4 |

|  |  |  | Comparative Example 6 | Comparative Example 7 | Comparative Example 8 | Comparative Example 9 | Comparative Example 10 |
|---|---|---|---|---|---|---|---|
|  |  |  | Toner base particles |  |  |  |  |
|  |  |  | Toner base particles 16 | Toner base particles 17 | Toner base particles 18 | Toner base particles 19 | Toner base particles 20 |
| Monomer | Styrene | Parts by mass | 124.0 | produced by pulverization method | produced by pulverization method | 166.0 | 160.0 |
|  | n-butyl acrylate | Parts by mass | 36.0 |  |  | 34.0 | 40.0 |
|  | Divinylbenzene | Parts by mass | 0.12 |  |  | 0.5 | 0.05 |
| Low-molecular weight resin | Styrene-type resin | Type | (1) |  |  | — | — |
|  |  | Parts by mass | 40 |  |  | — | — |
|  |  | Weight average molecular weight Mw | 3,150 |  |  | — | — |
|  |  | Glass transition point (° C.) | 55 |  |  | — | — |
|  |  | Composition | St/BA |  |  | — | — |
| Polar resin | Polyester-type resin | Type | (3) | (1) | (1) | (1) | (1) |
|  |  | Parts by mass | 10 | 10 | 10 | 10 | 10 |
|  |  | Weight average molecular weight Mw | 11,000 | 10,500 | 10,500 | 10,500 | 10,500 |
| Wax |  | Type | Fischer-Tropsch | Fischer-Tropsch | Fischer-Tropsch | Fischer-Tropsch | Fischer-Tropsch |
|  |  | Parts by mass | 15 | 15 | 15 | 15 | 15 |
| Colorant | Copper phthalocyanine | Parts by mass | 13 | 13 | 13 | 13 | 10 |
|  | Iron oxide | Parts by mass | — | — | — | — | — |
| Negative charge control agent |  | Parts by mass | 0.8 | 0.8 | 0.8 | 0.8 | 0.8 |
| Initiator | 1,1,3,3-tetramethylbutylperoxy-2-ethylhexanoate | Parts by mass | 20.0 | — | — | 5.0 | 7.0 |
|  | t-butylperoxy-neodecanoate | Parts by mass | — | — | — | — | — |
| Polymerization condition | Before switching | Temperature | 70 | — | — | 70 | 70 |
|  |  | Retention time (hours) | 6 | — | — | 6 | 6 |
|  | After switching | Temperature | 80 | — | — | 80 | 80 |
|  |  | Retention time (hours) | 4 | — | — | 4 | 4 |

TABLE 2-continued

| Toner | | Toner particles (16) | Toner particles (17) | Toner particles (18) | Toner particles (19) | Toner particles (20) |
|---|---|---|---|---|---|---|
| Toner physical properties | THF insoluble matter (%) | 24.5 | 28.7 | 35.2 | 8.2 | 13.5 |
| | Average circularity | 0.973 | 0.953 | 0.953 | 0.984 | 0.981 |
| | Mode circularity | 1.00 | 0.96 | 0.96 | 1.00 | 1.00 |
| | Weight average molecular weight Mw | 57,000 | 70,000 | 89,000 | 54,000 | 48,000 |
| | Weight average particle size (μm) | 5.8 | 6.7 | 6.7 | 6.8 | 5.8 |
| | Endothermic main peak temperature (° C.) | 70.4 | 70.4 | 70.3 | 70.4 | 70.3 |
| | Heat quantity integrated value (J/g) | 19.7 | 19.7 | 19.6 | 19.7 | 19.7 |
| | Glass transition point (° C.) | 59.4 | 59.1 | 58.9 | 59.8 | 61.2 |

TABLE 3

| | | | Polar resin No. | | |
|---|---|---|---|---|---|
| | | | (1) | (2) | (3) |
| | | | Molar ratio content | | |
| Composition | Polyester-type monomer | Bisphenol A (propylene oxide-modified) 2-mol adduct | 50 | 21 | 50 |
| | | Bisphenol A (ethylene oxide-modified) 2-mol adduct | — | 14 | — |
| | | Terephthalic acid | 51 | 35.1 | 49 |
| | | Maleic acid | — | — | 1 |
| | Vinyl-type monomer | Styrene | — | 29 | — |
| | | Acrylic acid | — | 1 | — |
| | | Di-tert-butyl peroxide | — | 5 | — |
| | | | Physical properties | | |
| Weight average molecular weight Mw | | | 10,500 | 11,000 | 11,000 |
| Weight average molecular weight Mw/Number average molecular weight Mn | | | 3.20 | 3.24 | 3.20 |
| Glass transition point (° C.) | | | 70 | 68 | 68 |

TABLE 4

| | | $\eta_{100}$ | $\eta_{110}$ | $A_{\eta T}$ |
|---|---|---|---|---|
| Example 1 | Toner particles (1) | 28,000 | 9,200 | −0.0483 |
| Example 2 | Toner particles (2) | 22,000 | 7,460 | −0.0470 |
| Example 3 | Toner particles (3) | 35,000 | 18,400 | −0.0279 |
| Example 4 | Toner particles (4) | 34,500 | 11,000 | −0.0496 |
| Example 5 | Toner particles (5) | 28,500 | 14,000 | −0.0309 |
| Example 6 | Toner particles (6) | 28,000 | 9,300 | −0.0479 |
| Example 7 | Toner particles (7) | 29,000 | 9,200 | −0.0499 |
| Example 8 | Toner particles (8) | 31,000 | 11,000 | −0.0450 |
| Example 9 | Toner particles (9) | 27,000 | 11,000 | −0.0390 |
| Example 10 | Toner particles (10) | 28,000 | 9,200 | −0.0483 |
| Comparative Example 1 | Toner particles (11) | 41,000 | 9,800 | −0.0622 |
| Comparative Example 2 | Toner particles (12) | 38,000 | 8,200 | −0.0666 |
| Comparative Example 3 | Toner particles (13) | 35,000 | 6,900 | −0.0705 |
| Comparative Example 4 | Toner particles (14) | 43,000 | 9,200 | −0.0670 |
| Comparative Example 5 | Toner particles (15) | 70,000 | 15,200 | −0.0663 |
| Comparative Example 6 | Toner particles (16) | 75,000 | 15,000 | −0.0699 |
| Comparative Example 7 | Toner particles (17) | 28,000 | 6,300 | −0.0648 |
| Comparative Example 8 | Toner particles (18) | 62,000 | 19,000 | −0.0514 |
| Comparative Example 9 | Toner particles (19) | 120,300 | 25,400 | −0.0675 |
| Comparative Example 10 | Toner particles (20) | 46,000 | 9,500 | −0.0685 |
| Comparative Example 11 | Toner particles (21) | 25,400 | 5,700 | −0.0649 |

TABLE 5

|  |  | L/L | | | N/N | | | H/H | | |
|---|---|---|---|---|---|---|---|---|---|---|
|  |  | Initial | 10,000 sheets | | Initial | 10,000 sheets | | Initial | 10,000 sheets | |
|  |  | stage Density | Density | Development line defect | stage Density | Density | Development line defect | stage Density | Density | Development line defect |
| Example 1 | Toner particles (1) | A | A | A | A | A | A | A | A | A |
| Example 2 | Toner particles (2) | A | A | A | A | A | A | A | A | A |
| Example 3 | Toner particles (3) | A | A | A | A | A | A | A | A | A |
| Example 4 | Toner particles (4) | A | A | A | A | A | A | A | A | A |
| Example 5 | Toner particles (5) | A | A | A | A | A | A | A | A | A |
| Example 6 | Toner particles (6) | A | B | B | A | B | B | A | B | B |
| Example 7 | Toner particles (7) | A | A | A | A | A | A | A | A | A |
| Example 8 | Toner particles (8) | A | A | A | A | A | A | A | A | A |
| Example 9 | Toner particles (9) | A | A | A | A | A | A | A | A | A |
| Example 10 | Toner particles (10) | A | A | A | A | A | A | A | A | A |
| Comparative Example 1 | Toner particles (11) | A | A | A | A | A | A | A | B | A |
| Comparative Example 2 | Toner particles (12) | A | B | B | A | B | B | B | C | B |
| Comparative Example 3 | Toner particles (13) | A | A | A | A | A | A | A | A | A |
| Comparative Example 4 | Toner particles (14) | A | A | A | A | A | A | A | A | A |
| Comparative Example 5 | Toner particles (15) | A | A | A | A | A | A | A | A | A |
| Comparative Example 6 | Toner particles (16) | A | A | A | A | A | A | A | A | A |
| Comparative Example 7 | Toner particles (17) | B | C | C | B | C | C | B | C | C |
| Comparative Example 8 | Toner particles (18) | B | C | C | B | B | C | B | B | C |
| Comparative Example 9 | Toner particles (19) | A | A | A | A | A | A | A | A | A |
| Comparative Example 10 | Toner particles (20) | A | A | A | A | A | A | A | A | A |
| Comparative Example 11 | Toner particles (21) | A | C | C | A | C | C | A | C | C |

|  |  | Blocking resistance | | Fixability | | |
|---|---|---|---|---|---|---|
|  |  | | | Fixable temperature | Gloss | Gloss Max fixing |
|  |  | 45° C. | 50° C. | region (° C.) | Max (%) | temperature (° C.) |
| Example 1 | Toner particles (1) | A | A | 120-225 | 41 | 165 |
| Example 2 | Toner particles (2) | A | A | 115-220 | 39 | 160 |
| Example 3 | Toner particles (3) | A | A | 130-235 | 32 | 175 |
| Example 4 | Toner particles (4) | A | A | 125-230 | 38 | 170 |
| Example 5 | Toner particles (5) | A | A | 125-235 | 40 | 165 |
| Example 6 | Toner particles (6) | A | B | 120-225 | 39 | 165 |
| Example 7 | Toner particles (7) | A | A | 120-225 | 41 | 165 |
| Example 8 | Toner particles (8) | A | A | 125-235 | 35 | 170 |
| Example 9 | Toner particles (9) | A | A | 120-225 | 39 | 170 |
| Example 10 | Toner particles (10) | A | A | 110-225 | 45 | 160 |
| Comparative | Toner particles | A | A | 130-220 | 36 | 175 |

TABLE 5-continued

| Example | Toner particles | | | | | |
|---|---|---|---|---|---|---|
| Example 1 | (11) | | | | | |
| Comparative Example 2 | Toner particles (12) | B | C | 130-215 | 35 | 170 |
| Comparative Example 3 | Toner particles (13) | A | A | 130-215 | 32 | 180 |
| Comparative Example 4 | Toner particles (14) | A | A | 130-220 | 34 | 175 |
| Comparative Example 5 | Toner particles (15) | A | A | 135-240 | 28 | 195 |
| Comparative Example 6 | Toner particles (16) | A | A | 140-245 | 26 | 195 |
| Comparative Example 7 | Toner particles (17) | B | B | 125-225 | 35 | 170 |
| Comparative Example 8 | Toner particles (18) | B | B | 125-225 | 36 | 175 |
| Comparative Example 9 | Toner particles (19) | A | A | 140-245 | 20 | 195 |
| Comparative Example 10 | Toner particles (20) | A | A | 135-235 | 27 | 185 |
| Comparative Example 11 | Toner particles (21) | A | B | 125-220 | 39 | 170 |

TABLE 6

| | | Comparative Example 11 |
|---|---|---|
| | Toner particles | Toner particles (21) |
| Toner physical properties | THF insoluble matter (%) | 21.2 |
| | Average circularity | 0.973 |
| | Mode circularity | 0.99 |
| | Weight average molecular weight Mw | 45,000 |
| | Weight average particle size (μm) | 5.8 |
| | Endothermic main peak temperature (° C.) | 122.4 |
| | Heat quantity integrated value (J/g) | 7.2 |
| | Glass transition point (° C.) | 59.2 |

What is claimed is:

1. A toner comprising toner particles having toner base particles each containing at least a binder resin and a colorant, wherein:
when viscosities of the toner particles measured at 100° C. and 110° C. by a flow tester heat-up method are represented by $\eta_{100}$ (Pa·s) and $\eta_{110}$ (Pa·s), respectively, an average variation in viscosity $A_{\eta T}$ represented by the following equation (1) satisfies a relationship of $0 \geq A_{\eta T} - 0.064$:

$$A_{\eta T} = (\log(\eta_{110}) - \log(\eta_{100}))/(110-100) \quad (1); \text{ and}$$

$\eta_{100}$ is 15,000 to 40,000 Pa·s.

2. A toner according to claim 1, wherein:
an endothermic main peak in a reversing heat flow curve of the toner particles measured by differential scanning calorimetry (DSC) is present in a range of 40 to 130° C.; and
a heat quantity integrated value Q of the endothermic main peak is 10 to 35 J/g per 1 g of the toner.

3. A toner according to claim 1, wherein: toner particles having a particle size of 2 μm or more have an average circularity in a range of 0.970 or more to 1.000 or less; and a mode circularity in a range of 0.98 or more to 1.00 or less.

4. A toner according to claim 1, wherein the toner particles contain 0.1 to 20.0 mass % of THF insoluble matter in terms of a resin.

5. A toner according to claim 1, wherein the toner particles contain a polar resin.

6. A toner according to claim 5, wherein the polar resin is a polyester resin.

7. A toner according to claim 5, wherein the polar resin is a styrene-modified polyester resin.

8. A toner according to claim 1, wherein the toner base particles comprise particles produced by granulating a monomer composition containing a polymerizable monomer, a colorant and an addition reactive resin having a double bond in an aqueous medium and polymerizing the monomer composition, and wherein
the addition reactive resin has signals in a range of 4.6 to 4.9 ppm and in a range of 5.0 to 5.2 ppm in a $^1$H-NMR chart in a nuclear magnetic resonance measuring device.

9. A method of producing a toner, comprising:
granulating a monomer composition containing a polymerizable monomer, a colorant, and an addition reactive resin having a double bond in an aqueous medium; and
polymerizing the monomer composition to produce toner base particles, wherein:
the toner contains toner particles having the toner base particles containing at least a binder resin and the colorant;
when viscosities of the toner particles measured at 100° C. and 110° C. by a flow tester heat-up method are represented by $\eta_{100}$ (Pa·s) and $\eta_{110}$ (Pa·s), respectively, an average variation in viscosity $A_{\eta T}$ represented by the following equation (1) satisfies a relationship of $0 \geq A_{\eta T} - 0.064$:

$$A_{\eta T} = (\log(\eta_{110}) - \log(\eta_{100}))/(110-100) \quad (1); \text{ and}$$

$\eta_{100}$ is 15,000 to 40,000 Pa·s, and wherein
the addition reactive resin has signals in a range of 4.6 to 4.9 ppm and in a range of 5.0 to 5.2 ppm in a $^1$H-NMR chart in a nuclear magnetic resonance measuring device.

* * * * *